United States Patent [19]
Norton

[11] Patent Number: 5,856,645
[45] Date of Patent: Jan. 5, 1999

[54] CRASH SENSING SWITCH

[76] Inventor: Peter Norton, P.O. Box 62, Northville, Mich. 48167

[21] Appl. No.: 468,706

[22] Filed: Jun. 6, 1995

Related U.S. Application Data

[63] Continuation-in-part of Ser. No. 249,840, May 26, 1994, abandoned, which is a continuation-in-part of Ser. No. 44,395, Apr. 30, 1987, abandoned, which is a continuation-in-part of Ser. No. 20,680, Mar. 2, 1987, Pat. No. Des. 304,362, which is a continuation-in-part of Ser. No. 759,431, Sep. 13, 1991, abandoned, which is a continuation-in-part of Ser. No. 529,716, May 25, 1990, abandoned, which is a continuation of Ser. No. 364,640, Jun. 12, 1989, abandoned, which is a continuation-in-part of Ser. No. 262,732, Oct. 26, 1988, abandoned, which is a continuation-in-part of Ser. No. 218,917, Jul. 14, 1988, abandoned, which is a continuation-in-part of Ser. No. 190,165, May 4, 1988, abandoned.

[51] Int. Cl.$^6$ .................................................. H01H 35/14
[52] U.S. Cl. ................................ 200/61.53; 200/61.45 R
[58] Field of Search .................... 200/61.45 R–61.45 M; 73/488, 497, 514.01, 514.05, 514.06, 514.07; 280/735

[56] References Cited

U.S. PATENT DOCUMENTS

| | | | |
|---|---|---|---|
| 3,742,163 | 6/1973 | Gawlick et al. | 200/61.45 R |
| 3,889,130 | 6/1975 | Breed | 307/121 |
| 4,097,699 | 6/1978 | Larson | 200/61.45 R |

*Primary Examiner*—Michael A. Friedhofer
*Attorney, Agent, or Firm*—Reising, Ethington, Learman & McCulloch, PLLC

[57] ABSTRACT

A crash sensing switch for automotive vehicles has a cylindrical piston that moves sealingly in a tube during a crash to bridge a pair of contacts. Viscous flow of air through ducts creates pressures that resist movement of the piston. A venting valve may be incorporated in the piston to increase contact dwell. Impedance of the ducts may be adjusted during manufacture by blocking one or more of the ducts. The clearance between the piston and the tube limits air flow between the piston and the walls of the tube and provides aerodynamic lubrication between the piston and the tube during cross axis vibrations. A piston ring may assist in preventing air flow between the piston and the walls of the tube. There may be compensation for changes of air viscosity with temperature. One way to compensate is to make the contacts of thermostat metal which bends with temperature to change the distance the piston must move to bridge the contacts. Another way is to provide a valve incorporating thermostat metal which opens or closes certain ducts to compensate for changes of air viscosity with temperature. Compensation for variation of air viscosity with temperature may be provided at higher temperatures but not at lower temperatures. An injection molded cap includes connector pins to form an integral connector and hermetically seal the interior from the environment. Contact height setters may be incorporated into the cap to assure the desired piston movement for switch closure. Calibration may be done at manufacture by adjusting the piston movement required for switch closure. The combination of these elements provides a crash sensing switch having superior performance and costing much less than known crash sensing switches.

77 Claims, 17 Drawing Sheets

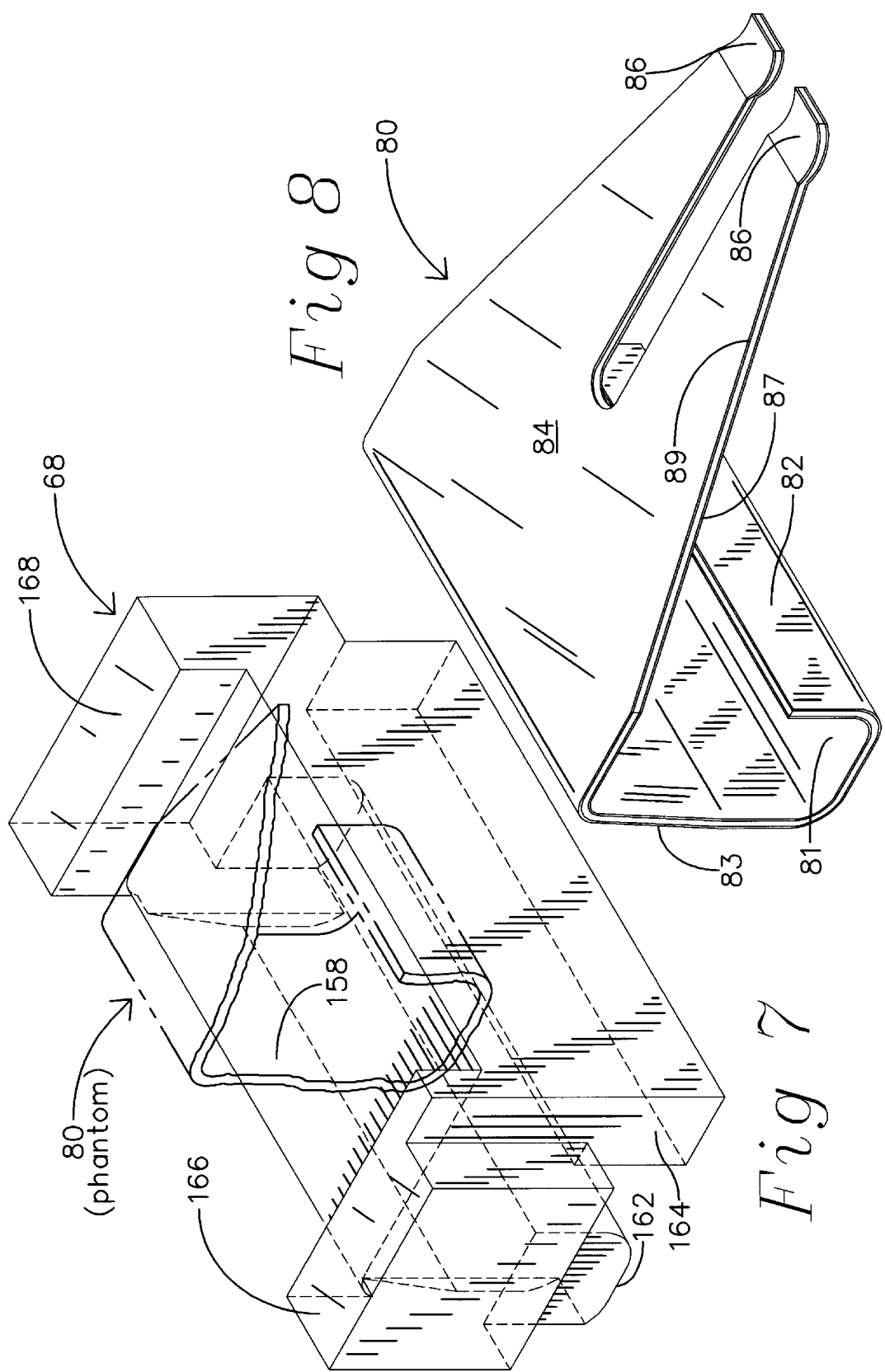

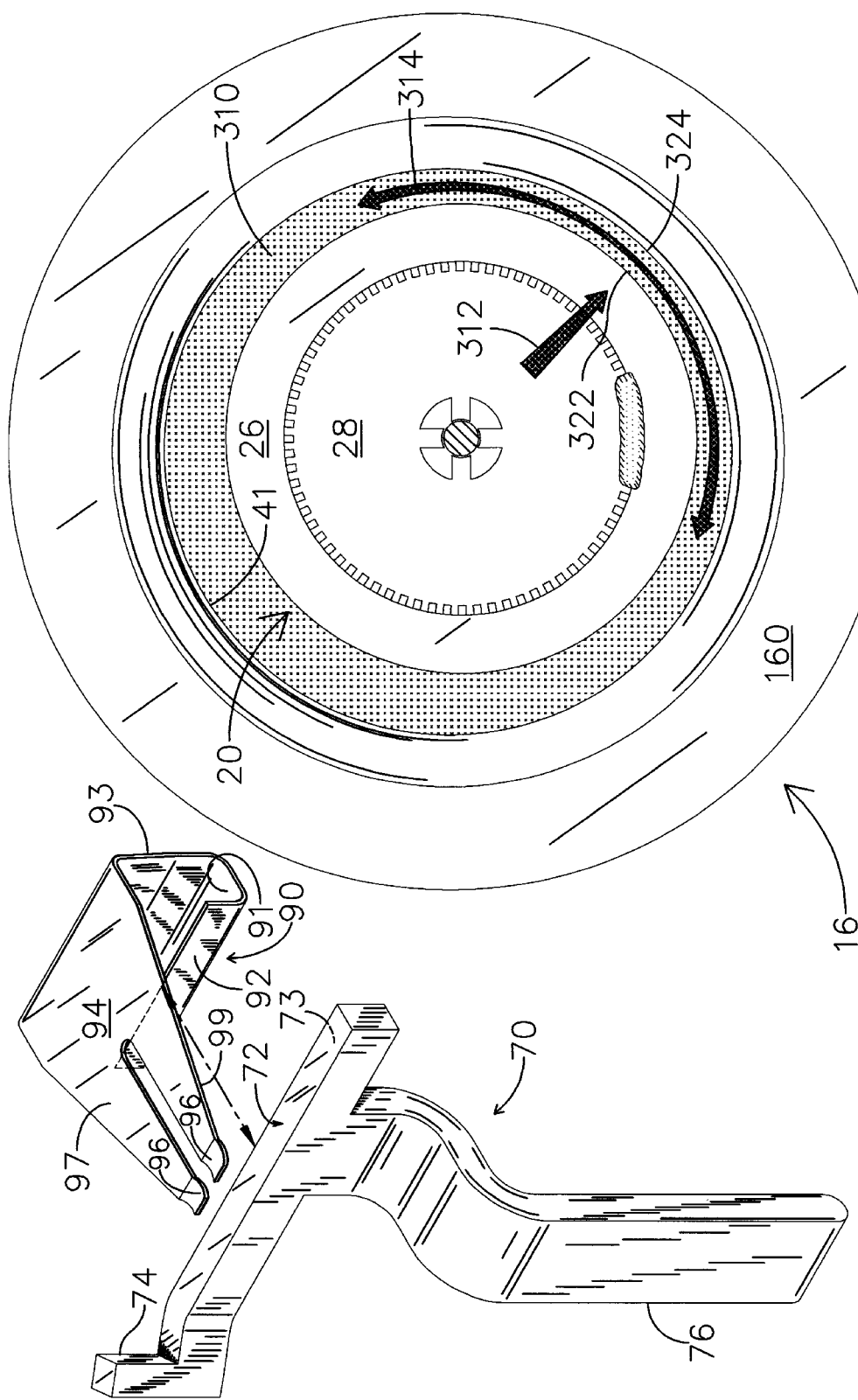

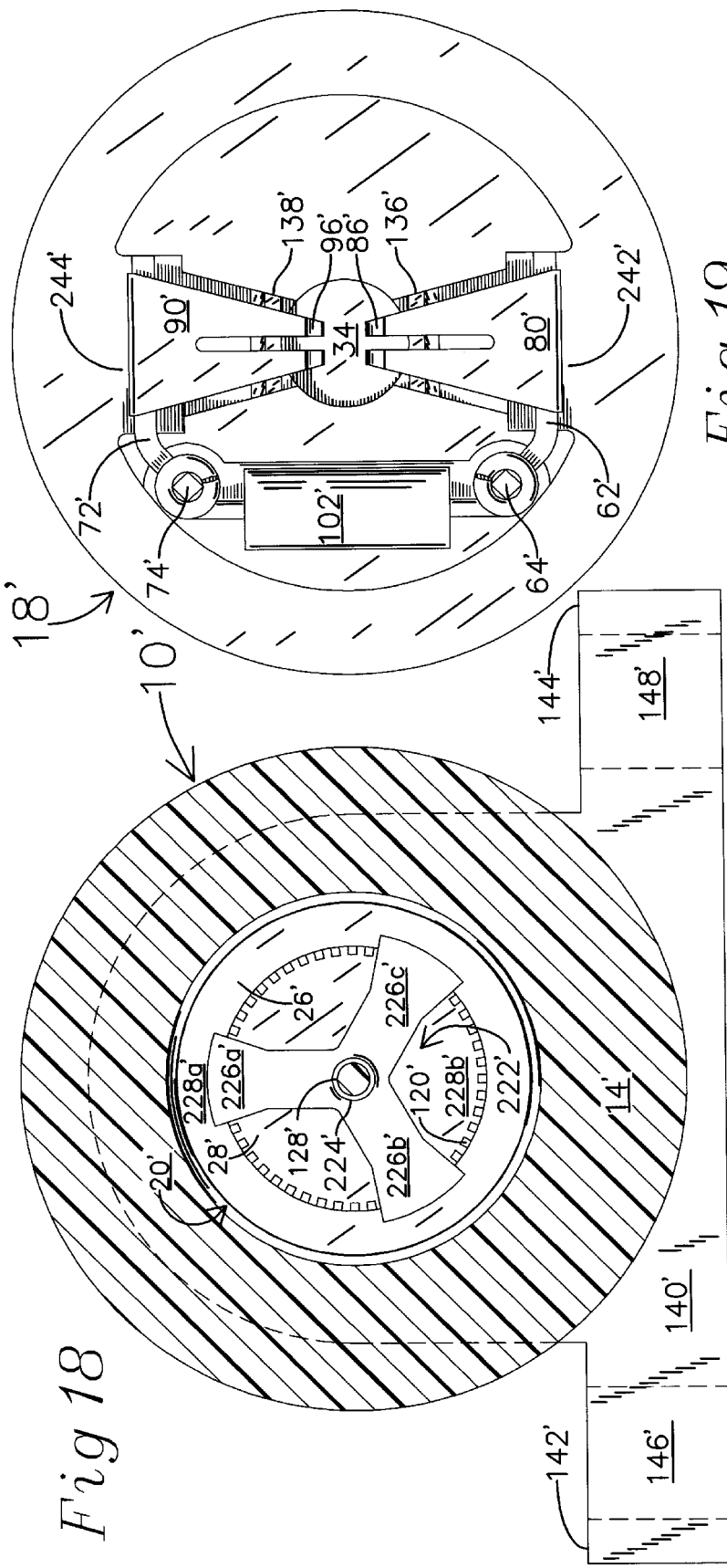

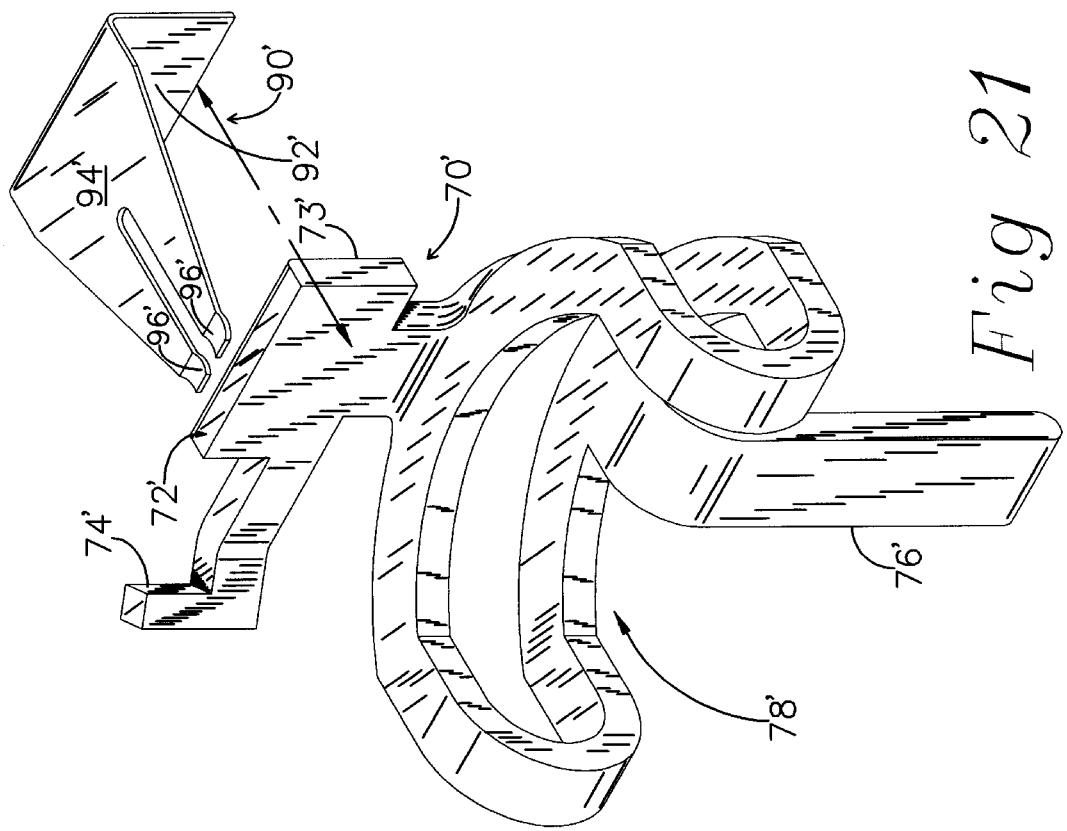
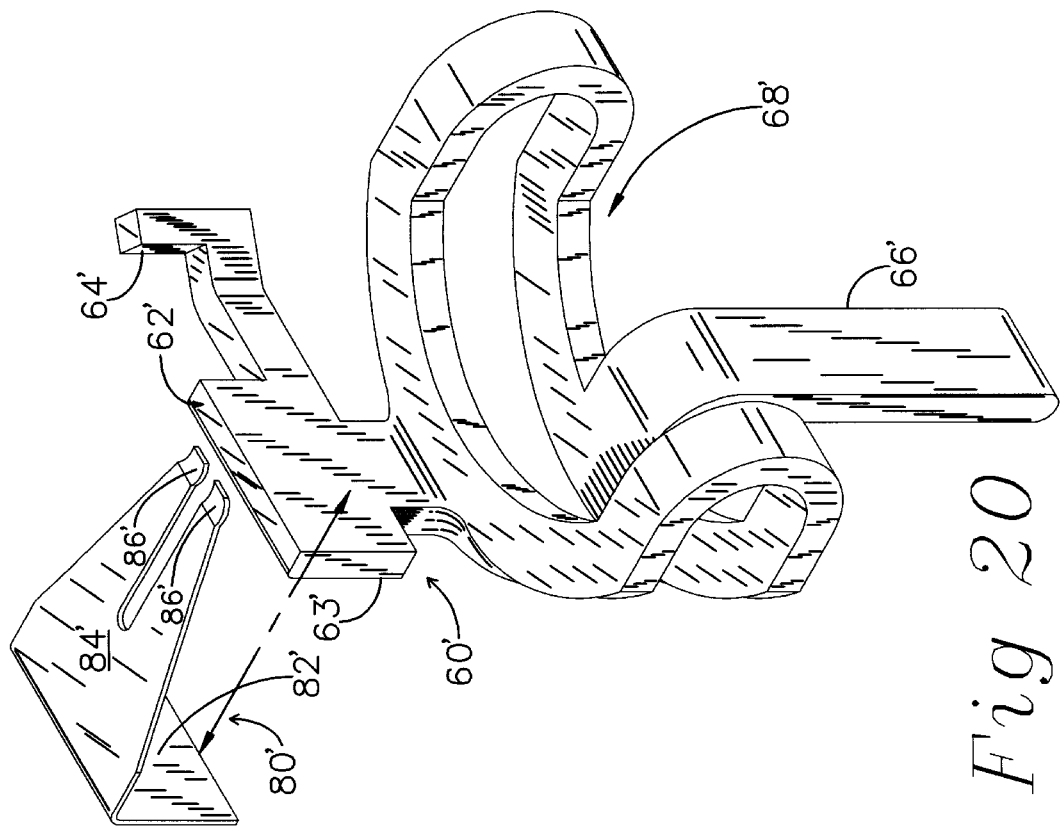

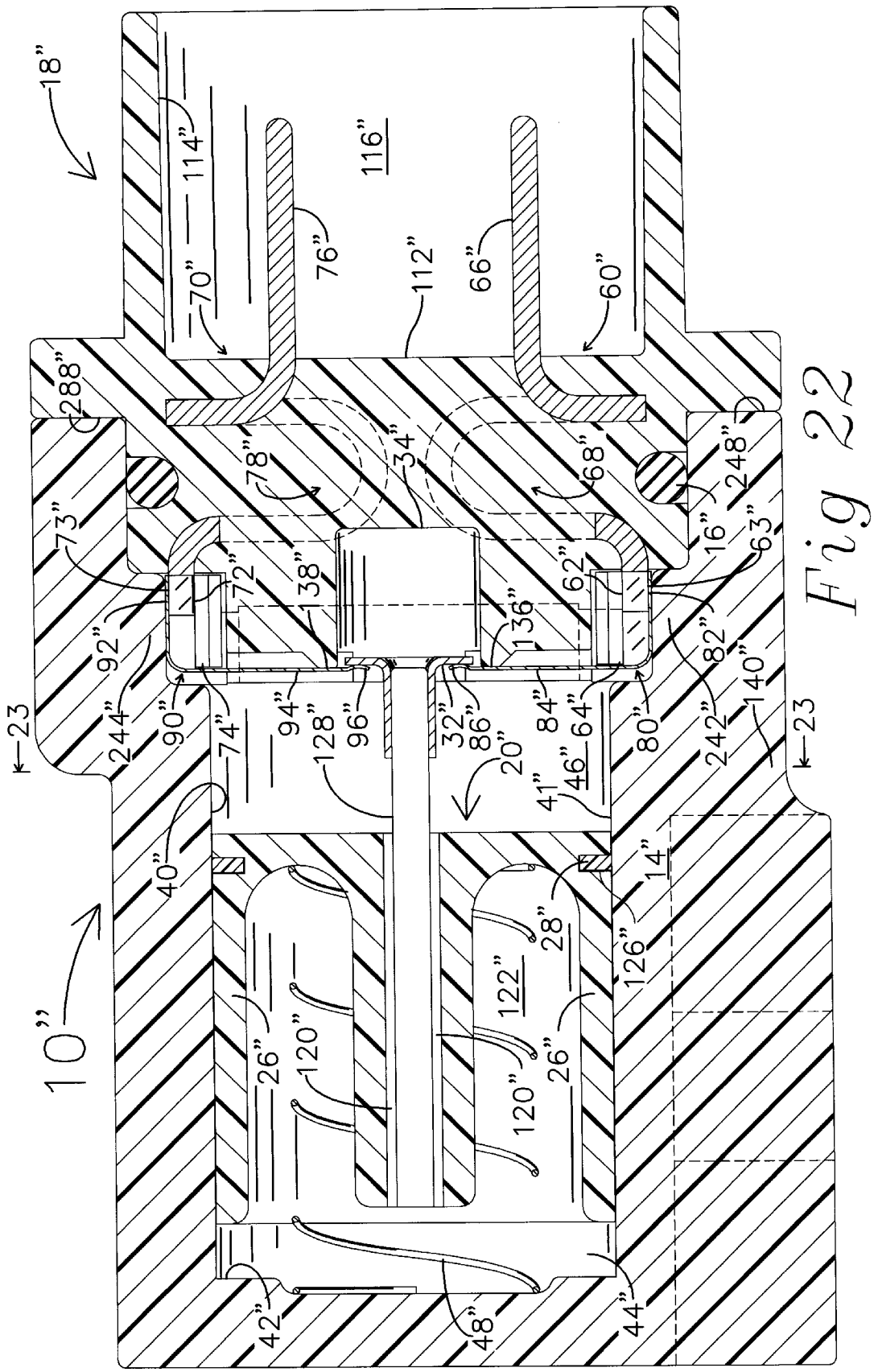

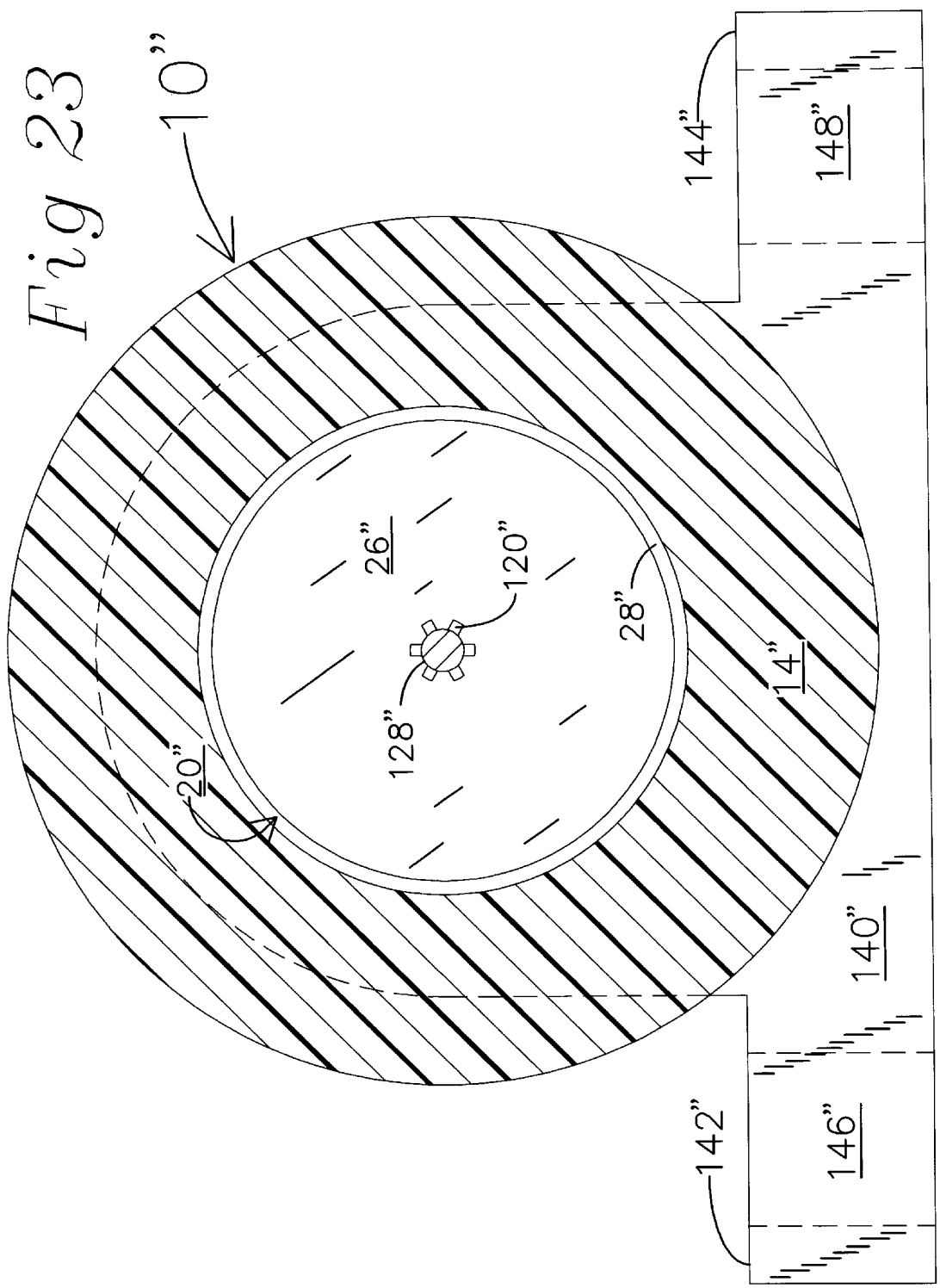

CRASH SENSING SWITCH

This is a continuation-in-part of application Ser. No. 249,840 filed May 26, 1994, now abandoned, for "Crash Sensing Switch" which is a continuation-in-part of application Ser. No. 044,395 filed Apr. 30, 1987, for "Low Cost Crash Sensing Switch" and is a continuation-in-part of application Ser. No. 020,680 filed Mar. 2, 1987 now U.S. Pat. No. D304,362, for "Crash Sensing Switch" and is a continuation in part of application Ser. No. 759,431 filed Sep. 13, 1991, now abandoned, for "Crash Sensing Switch" which is a continuation-in-part of application Ser. No. 529,716, now abandoned, filed May 25, 1990 for "Compact Crash Sensing Switch With Air Channels and Diagnostic System" which a file wrapper continuation of application Ser. No. 364,640 filed Jun. 12, 1989, now abandoned, for "Compact Crash Sensing Switch With Air Channels and Diagnostic System" which is a continuation-in-part of application Ser. No. 262,732 filed Oct. 26, 1988, now abandoned, for "Compact Crash Sensing Switch With Air Channels and Diagnostic System" which is a continuation-in-part of application Ser. No. 218,917 filed Jul. 14, 1988, now abandoned, for "Compact Crash Sensing Switch With Air Channels and Diagnostic System" which is a continuation-in-part of application Ser. No. 190,165 for "Compact Crash Sensing Switch and Diagnostic System" filed May 4, 1988, now abandoned.

FIELD OF THE INVENTION

This invention relates to switches that close upon collision of automotive vehicles for activating occupant protection devices such as air bags or belt tensioners.

BACKGROUND OF THE INVENTION

This invention is an improvement on a crash sensing switch that is in commercial production which has a ball that moves in a sealed tube to bridge a pair of electrical contacts. During a crash the inertia of the ball causes it to move toward the contacts. For the ball to reach the contacts air must flow around the ball between the ball and the tube. Viscosity of the air in combination with inertia of the air causes a pressure differential that opposes ball movement through the tube. It is believed that in most vehicle crashes the viscous contribution to the pressure differential predominates over the inertial contribution. Viscous flow is proportional to the pressure differential which is proportional to the product of the mass of the ball and the deceleration of the crash sensing switch. The proportionality of viscous flow to deceleration and the requirement that the ball move a predetermined distance to bridge the contacts causes the current production crash sensing switch to be an acceleration integrator that completes the firing circuit upon a predetermined vehicular velocity change. A permanent magnet in the commercial production crash sensing switch provides a bias force that urges the ball toward a normal resting position away from the electrical contacts. The bias force also causes the vehicular velocity change required for switch closure to increase with the duration of the crash.

The tube and ball of the commercial production crash sensing switch are made of stainless steels having different temperature expansion coefficients to provide compensation for the variation of air viscosity with temperature. The differential thermal expansion causes the gap between the ball and tube to change with temperature and reduce the effect of variation of air viscosity over the range of operating temperatures. An elastomeric seal in the commercial production crash sensing switch reduces transmission of cross axis vibrations to the ball and tube.

This commercial production crash sensing switch is expensive to manufacture and one reason for the high cost is the high precision required of the ball and the tube. Another reason for the high cost is that the tube material is difficult to work. Further, connecting the electrical contacts, lead wires and a diagnostic resistor by soldering creates contamination that cannot be tolerated near the ball and tube. Therefore, additional components and processing steps are required to protect the ball and tube during manufacturing. This commercial production crash sensing switch is particularly sensitive to contamination because small particles can wedge between the ball and the tube and interfere with movement of the ball.

When a vehicle going at high speed strikes a rigid obstacle the very high deceleration causes high air velocity in the commercial production crash sensing switch. Overcoming air inertia reduces the pressure available to overcome viscous resistance to air flow. Furthermore, the pressure required to overcome inertia is independent of temperature because it does not depend on viscosity resulting in excessive temperature compensation. Also, when the flow is inertial the crash sensing switch is not a velocity integrator because inertially damped air flow does not increase linearly with pressure.

In another known crash sensing switch having a ball and a tube a spring provides the bias force. A permanent magnet has the advantage of simplicity but the cost is significant and its large size increases the size of the crash sensing switch. Another difference is that the magnetic force decreases as the ball moves toward the electrical contacts whereas the spring force increases. In most designs the bias force is small therefore sensors with spring bias and sensors with magnetic bias perform similarly.

U.S. Pat. No. 4,932,260 issued Jun. 12, 1990 to Peter Norton for "Crash Sensing Switch With Suspended Mass" describes a crash sensing switch having a suspended mass in which air ducts conduct the air displaced by the movement of the sensing mass and in which varying the normal resting position of the armature provides compensation for variation of air viscosity with temperature by varying the armature travel according to the temperature.

Copending application Ser. No. 183,134 filed Jan. 18, 1994 for "Compact Crash Sensing Switch With Air Channels and Diagnostic System" describes a crash sensing switch having a much smaller ball than current production crash sensing switches sealingly movable in a tube and in which air ducts conduct most of the air displaced by the movement of the ball and in which a semiconductor device completes the firing circuit. This crash sensing switch also uses the semiconductor circuit to provide diagnostic capabilities. The semiconductor switch and diagnostic features of that invention are applicable to the present invention.

For certain applications, for example when used as a passenger compartment crash sensing switch, a viscously damped crash sensing switch is designed to close at a much lower velocity change at high decelerations than at lower decelerations. This is accomplished by making the bias force larger relative to the viscous damping forces.

It has recently become common to place an electronic crash sensing switch in or near the passenger compartment of a vehicle. These crash sensing switches are known as "single point crash sensors". This design is advantageous because it can eliminate the wiring and assembly time required when the crash sensing switch is located in the forward part of the vehicle. However, in certain vehicles it has not been possible to identify all crashes requiring air bags from information received at a single point in the passenger compartment. For those vehicles one solution is to place an auxiliary sensor in the forward part of the vehicle and connect it to the "single point crash sensor" to provide additional information to enable timely detection of all crashes. Forward auxiliary sensors or "auxiliary discriminating sensors" are known by the acronym "ADS". An ADS needs to conduct only a few milliamperes to initiate operation of an electronic circuit and it needs only to close, it does not need to remain closed for a significant period of time.

The crash sensing system of a vehicle must initiate deployment of the occupant protection systems some time before the protection is required. The crash sensing switch is typically required to initiate deployment of air bags 30 milliseconds before a free body in the passenger compartment moves six inches (150 mm.) forward from its pre crash position. The basis for this requirement is that an air bag should be deployed before the occupant has moved six inches (150 mm.) and deployment of an air bag typically takes 30 milliseconds.

Pyrotechnic devices provide the gas to inflate air bags. Several well-known inflators use the decomposition of sodium azide to generate gas for inflating the air bag. Another design, known as a hybrid design, uses a combustible material to heat stored argon gas for filling the air bag.

The rate at which inflators inflate air bags depends on the temperature of the inflator. At higher temperatures inflators produce a greater volume of gas and produce it more rapidly than at lower temperatures. This is true of both inflators based on decomposition of sodium azide and hybrid inflators. At the lowest temperatures in the operating range deployment may be delayed by ten milliseconds or more relative to a nominal deployment. At the highest temperatures in the operating range deployment may be accelerated by ten milliseconds or more. In prior occupant protection systems this effect has been ignored. One reason it has been ignored is because the temperature of the inflator has been assumed to be independent of ambient temperature because it is located in the passenger compartment where temperatures are controlled to make the occupants comfortable. However, the air bag and other apparatus surrounding the inflator thermally insulate it from the passenger compartment and there is a delay between the time the passenger compartment air reaches a controlled temperature and the time the inflator temperature approaches the passenger compartment air temperature. Consequently, on cold days inflators are colder on average than on hot days and air bag deployment occurs more rapidly on average on hot days than on cold days.

Consider, for example, an air damped crash sensing switch without compensation for the variation of air viscosity with temperature and designed to close at a velocity change of nine miles per hour at a nominal temperature. At a very cold temperature it would close at a velocity change of about seven miles per hour therefore it might close a few milliseconds sooner than if it had temperature compensation. Closing sooner may be desirable because it might compensate for slower deployment of the air bag at low temperatures. The advantage of earlier initiation when deployment is wanted might justify a small number of undesired deployments during low speed crashes at low temperatures.

Considering further the example of an uncompensated nine mile per hour air damped crash sensing switch. At a very high temperature it might close at a velocity change of eleven miles per hour therefore closing a few milliseconds later than if it had temperature compensation and it would not close during low velocity crashes having velocity changes between nine and eleven miles per hour. Neither of these consequences is desired.

It follows that a crash sensing switch with compensation for variations of air viscosity with temperature at temperatures above a nominal temperature but without compensation at temperatures below a nominal temperature may be desired.

Thermostat metals are sheets made of layers of metals having different thermal expansion coefficients that flex as the temperature changes. These materials are well known and have been used for many years in such as home thermostats. A wide selection of materials is presently available commercially from several suppliers. One of these suppliers is Texas Instruments.

Polytetrafluoroethylene (abbreviated PTFE) is sold under various trade names, one of which is "Teflon". Polytetrafluoroethylene and materials containing it can be inexpensively coated on metals to provide a low coefficient of friction.

Certain plastics, one of which is polyphenylene sulfide, combined with filaments of fiberglass can be molded to make objects having accurate linear dimensions. Polyphenylene sulfide also offers superior resistance to moisture absorption and moisture vapor permeation, good mechanical strength, and dimensional stability over a wide temperature range.

Crash sensing switches having ducts for viscously conducting air displaced by movement of sensing masses are described In U.S. Pat. No. 4,932,260 and in the copending application Ser. No. 183,134 referred to hereinabove.

One advantage of using air ducts to meter air flow instead of using the space between a ball and a tube as is done in the hereinabove described commercial production crash sensing switches is that the greater length and four sides of the ducts compared with the much shorter effective length and two sides of the gap between the ball and the tube enable the ducts to have larger width dimensions than the gap between the ball and the tube which reduces manufacturing cost. Another advantage is that the resistance of the air ducts to air flow can be adjusted during manufacture. One way to adjust the resistance of the ducts to air flow is by opening or plugging some of the ducts. Where the ducts result from mating a fluted surface and a smooth surface, another way to adjust the resistance of the ducts to air flow is by adjusting the pressure between the lands of the fluted surface and the smooth surface.

Another advantage of using air ducts to meter air flow is that air ducts provide design flexibility not possible in a crash sensing switch of the commercial production ball in tube design. As described hereinabove, air inertia affects air flow at high decelerations. In the aforementioned commercial production crash sensing switches the accelerations at which air inertia becomes significant are completely determined by the mass of the ball and the specified calibration. Ducts enable control of the vehicle deceleration at which air flow becomes significantly affected by inertia. A larger number of smaller ducts provide lower air velocity and smaller inertial effects than fewer larger ducts at the same pressure. Therefore, an advantage is that the number of ducts may be varied to adjust the degree to which the air flow is affected by inertia. Even greater flexibility results because in a single crash sensing switch different ducts may be made with different width dimensions thereby causing different inertial effects in different ducts.

Before crash sensing switches based on flow of air in ducts were made and tested it was anticipated that the air flow would be turbulent in larger ducts at higher pressures because the Reynolds number would be large. The Reynolds number is the product of the duct width, the air density, the velocity of air flow and the reciprocal of the viscosity. It commonly stated that flow is likely to be turbulent at Reynolds numbers greater than 2000. However, our experience is that in ducts as large as 0.5 millimeter square and 11 millimeters long and at pressures as high as twenty pounds per square inch the flow rate through the duct is accurately represented by the equations of laminar flow.

A general object of this invention is to provide a crash sensing switch for automotive vehicles which also overcomes certain disadvantages of the prior art.

SUMMARY OF THE INVENTION

The present invention provides a crash sensing switch of the type having a viscously damped sensing mass movable in a sealed tube and having means to conduct electricity when the sensing mass reaches a firing position; the crash sensing switch being highly reliable, compact, light in weight, and economical to manufacture.

Further, in accordance with this invention, a crash sensing switch has a pneumatically damped piston movable in a sealed tube with means to conduct electricity when the piston has reached a firing position that is highly reliable, compact, light in weight, and economical to manufacture.

Further, in accordance with this invention, the preponderance of the air displaced by the movement of the piston flows through ducts in the piston. This provides constant viscous resistance to air flow compared with the variable resistance to flow of the aforementioned commercial production crash sensing switch and allows adjustment of the crash sensing switch performance by varying the size and number of the ducts.

Further, in accordance with certain embodiments of this invention, valves made of thermostat metal may block air flow through selected ducts at lower temperatures and not at higher temperatures thereby compensating for the variation of air viscosity with temperature.

Further, in accordance with certain embodiments of this invention, reduced compensation for variation of air viscosity with temperature is provided thereby compensating for the more rapid deployment of air bags at higher temperatures and the less rapid deployment of air bags at lower temperatures.

Further, in accordance with certain embodiments of this invention, compensation for variation of air viscosity with temperature is provided only at temperatures greater than a nominal temperature thereby compensating for the less rapid deployment of air bags at lower temperatures.

Further, in accordance with certain embodiments of this invention, there is no compensation for variation of air viscosity with temperature thereby compensating for the more rapid deployment of air bags at higher temperatures and the less rapid deployment of air bags at lower temperatures.

Further, in accordance with certain embodiments of this invention, the electrical contacts may be made of thermostat metal thereby compensating for the variation of air viscosity with temperature.

Further, in accordance with certain embodiments of this invention, electrical conductors pass from the inside of the crash sensing switch to the outside with a sufficient length of the conductor in contact with the injection molded plastic to prevent leakage between the inside and the outside of the crash sensing switch.

Further, in accordance with certain embodiments of this invention, upon bridging the electrical contacts the contact bridging means is restrained from continuing to move with the remainder of the piston thereby providing greater movement of the piston than could be provided solely by flexing flat spring electrical contacts of the required dimensions and thereby providing enhanced contact dwell following initial contact closure.

Further, in accordance with certain embodiments of this invention, the contact bridging means also includes a valve element that opens to allow air to bypass the ducts thereby providing freer movement of the piston and enhanced contact dwell following initial contact closure.

Further, in accordance with certain embodiments of this invention, the electrical contacts urge their tips to move toward the bridging means upon conducting electricity thereby providing enhanced contact dwell following initial closure.

Further, in accordance with certain embodiments of this invention, the piston moves in a cylindrical tube that it divides into two sealed compartments and seals against air flow between the piston and the tube by virtue of the close fit between the piston and the inner diameter of the tube.

A key feature of the invention results from the discovery that in a crash sensing switch of the type having a viscously damped sensing mass sealingly movable in a sealed tube in which the sensing mass is a cylindrically shaped piston of about five grams mass (similar to the mass of the ball in commercial production ball in tube crash sensing switches) and with a diameter and length of about one-half inch (12.7 mm.) by one-half inch a diametral difference of about 0.0012 inch (0.03 mm.) between the piston and the tube provides adequate sealing without additional sealing means even in the worst case when the gap is crescent shaped. With a difference in diameter between the piston and the tube of 0.0012 inch (0.03 mm.) or less only about 5 percent or less of the air displaced by movement of the piston leaks through the clearance. This leakage is so small that manufacturing tolerances in the piston outside diameter and tube inside diameter only minimally affect the performance of the crash sensing switch. This is advantageous because the required tolerances are inexpensive to achieve and the gap is large enough to assure free piston movement. Since the leakage varies as the third power of the gap, reducing the diameter only slightly greatly reduces the leakage. For example, changing the gap from crescent shaped to annular for the same diametral difference of 0.0012 inch (0.03 mm.) reduces the leakage from about 5 percent to about 1 percent. The lower leakage approximates what will happen during most vehicular crashes because the cross axis vibrations, as will be discussed hereinafter, cause the piston to locate itself in the center of the tube with an approximately annular gap between the piston and the tube it moves in.

Further, under certain favorable circumstances, a diametral difference of as much as 0.005 inch (0.13 mm) between the piston and the inside diameter of the tube provides adequate sealing without additional sealing means. It is believed that the following three requirements must be met for such a large clearance to be acceptable: 1) The piston should have a low mass relative to its diameter such as would result from being made of a low density material such as plastic or hollowed out metal. A circumstance where a low mass piston might be appropriate is if the crash sensing switch is required to conduct only small currents such as for operating electronic logic circuits. 2) There are cross axis vibrations during operation causing the piston to center itself in the tube thereby creating an annular gap rather than a crescent shaped gap which minimizes the leakage through the gap. 3) The tolerances on the performance of the crash sensing switch must not be critical. One reason wide tolerances might be acceptable is if the crash sensing switch is an auxiliary discriminating sensor used only for the purpose of sensing certain crashes that are not easily sensed by a crash sensing device located in the passenger compartment of a vehicle. The large clearance and reduced electric current carrying requirement enable all of the parts of the crash sensing switch other than electric current carrying elements to be made of plastic molded to ordinary commercial tolerances which makes the crash sensing switch inexpensive to manufacture.

Further, in accordance with certain embodiments of this invention, cross axis vibrations occurring during a vehicle crash operate to create an air bearing between the piston and the tube in which it moves thereby lubricating the movement of the piston.

Further, in accordance with the invention, an air bearing between the piston and the tube in which it moves operates to center the radial position of the piston in the tube thereby causing the gap between the piston and the tube to be annular and increasing the resistance of the gap to the flow of air.

A second key feature of the invention results from the discovery that the coefficient of friction between injection molded polyphenylene sulfide and Emrilon 330 is very low. This enables a low coefficient of friction between the piston and the tube to be achieved using inexpensive molded plastic parts.

Further, in accordance with certain embodiments of this invention, a PTFE coating provides reduced frictional resistance to movement of the piston.

Further, in accordance with certain embodiments of this invention, electrical conductors pass from the inside of the crash sensing switch to the outside by a circuitous route that prevents leakage between the inside and the outside of the crash sensing switch.

A complete understanding of this invention may be obtained from the description that follows taken with the accompanying drawings.

DESCRIPTION OF THE DRAWINGS

FIG. 7 shows an isometric view of the contact retainer of the first embodiment of the invention with many hidden lines illustrated and a phantom illustration of part of an electrical contact being retained by the contact retainer.

FIG. 8 shows an isometric view of an electrical contact of the first embodiment of the invention illustrated in FIG. 1.

FIG. 9 shows an isometric view of a terminal of the first embodiment of the invention with the corresponding electrical contact illustrating the relative positioning therebetween.

FIG. 10 shows the piston of the invention in the tube in which it moves with the gap between the piston and the tube greatly exaggerated to illustrate the cushioning and lubrication provided by the air in the gap.

FIG. 18 shows the piston of the invention and the cup in which the piston moves taken at section 18—18 of FIG. 15.

FIG. 19 shows the internal side of the integral connector of the fourth embodiment of the invention and illustrates the electrical contacts, the diagnostic resistor and the connection of the diagnostic resistor to the connector pins.

FIG. 20 shows an isometric view of one terminal and the corresponding electrical contact of the fourth embodiment of the crash sensing switch of the invention and illustrates the positioning of the electrical contact with respect to the terminal.

FIG. 21 shows an isometric view of the other terminal and the corresponding electrical contact of the fourth embodiment of the crash sensing switch of the invention and illustrates the positioning of the electrical contact with respect to the terminal.

FIG. 22 shows a fifth embodiment of the crash sensing switch of the invention with the piston positioned where it is beginning to bridge the electrical contacts.

FIG. 23 shows the piston of the fifth embodiment of the crash sensing switch of the invention and the cup in which the piston moves taken at section 23—23 of FIG. 22.

BEST MODE FOR CARRYING OUT THE INVENTION

Figure 1:
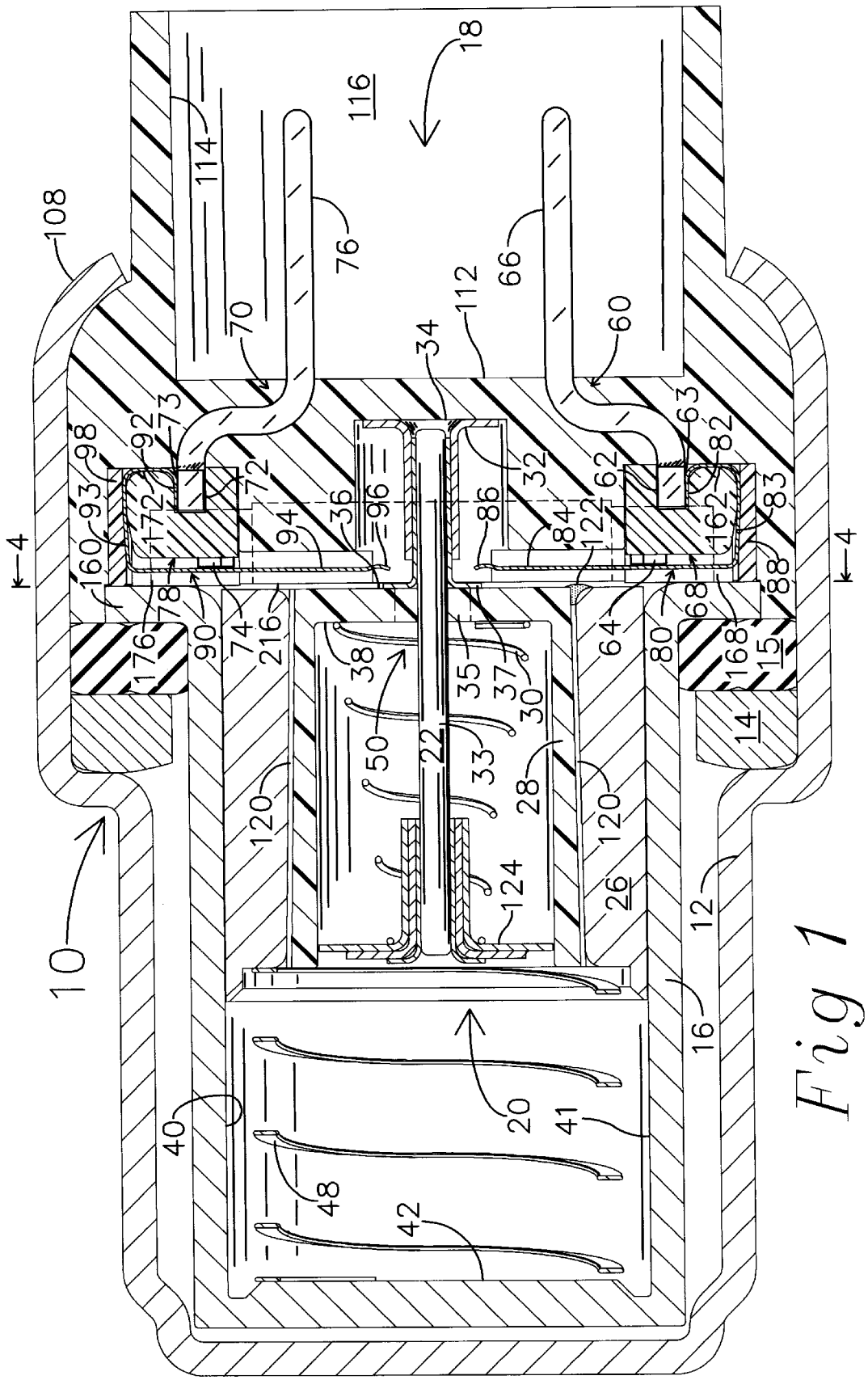
FIG. 1 shows a complete crash sensing switch of the invention in a first embodiment with some parts shown in section and the piston in its normal or resting position.
Figure 2:
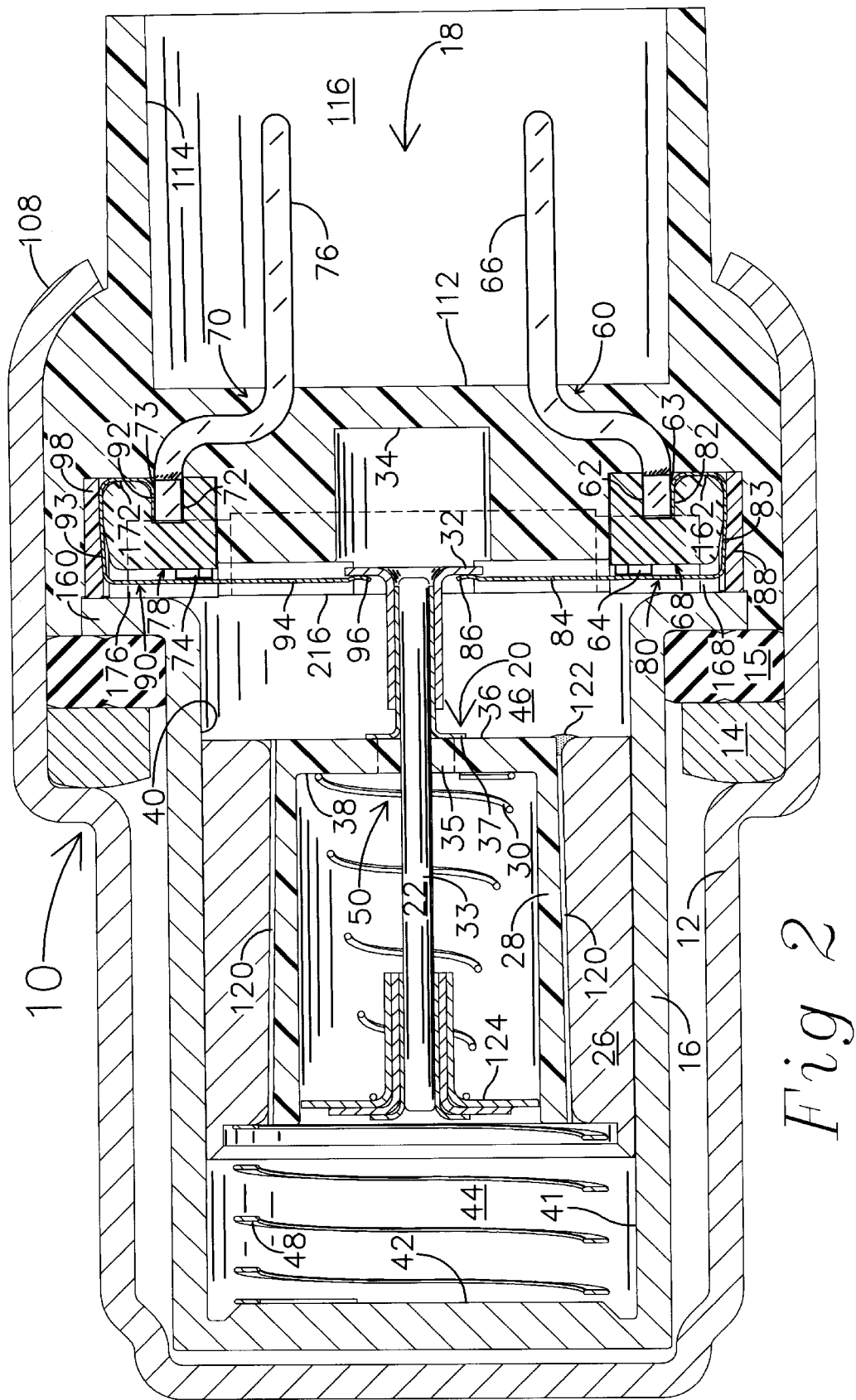
FIG. 2 shows the crash sensing switch of the invention as illustrated in FIG. 1 but with the piston moved to where the electrical contacts are first bridged.
Figure 3:
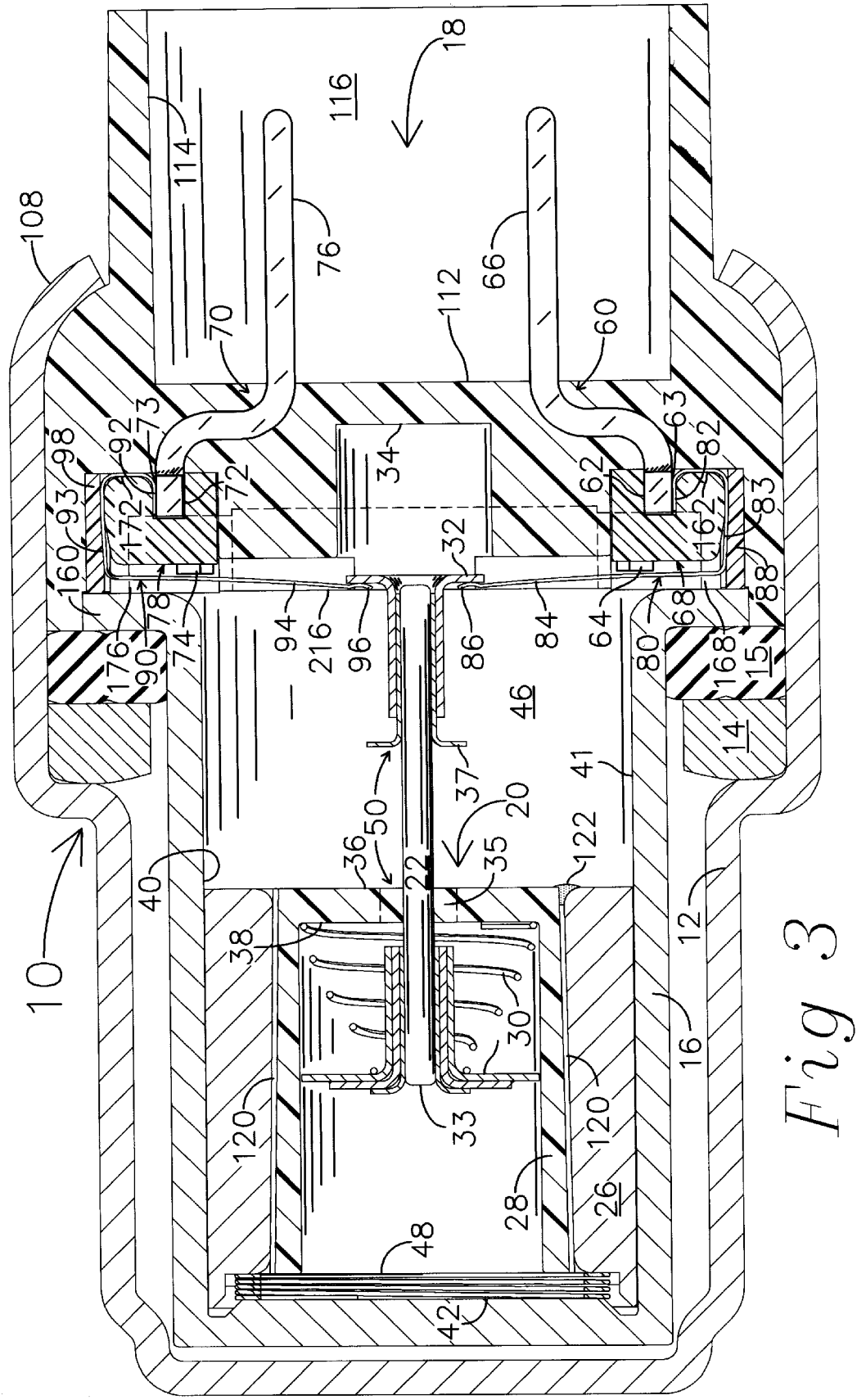
FIG. 3 shows the crash sensing switch of the invention as illustrated in FIG. 1 but with the piston at its point of maximum travel and the venting valve open.

Referring now to FIGS. 1 through 3, the crash sensing switch 10 comprises a switch for sensing an acceleration pulse indicative of a crash. Upon sensing a crash the switch closes to initiate deployment of the occupant protection apparatus. It will be appreciated as the description proceeds that the invention may be implemented in different embodiments.

Referring particularly to FIGS. 1 through 3, the crash sensing switch 10 includes a piston 20 comprising a valve element 22 having a gold plated bridging contactor 32 for bridging two electrical contacts 80 and 90. Piston 20 moves in cylindrical cavity 40 defined by the inside diameter 41 of cup 16 and has a normal resting position where bridging contactor 32 rests against stop 34 in integral connector 18 as illustrated in FIG. 1. During a frontal collision of a vehicle, piston 20 moves toward end 42 of cylindrical cavity 40 to a position where bridging contactor 32 touches contact tips 86 and 96 as illustrated in FIG. 2 and completes an electrical circuit comprising terminal 60, electrical contact 80, bridging contactor 32, electrical contact 90, terminal 70, and other components of the occupant protection system that are not illustrated. As it moves, piston 20 displaces air causing it to flow through ducts 120 from chamber 44 to chamber 46 of cylindrical cavity 40. Refer to FIG. 2 for identification of chambers 44 and 46. The preponderance of the displaced air flows through the ducts 120 and not between outer sleeve 26 of piston 20 and the inside diameter 41 of cup 16 by virtue of the close fit therebetween or other known sealing means. If the frontal collision is sufficiently severe piston 20 will move beyond the position illustrated in FIG. 2 toward end 42 of cylindrical cavity 40. FIG. 3 shows the crash sensing switch 10 with piston 20 at its position of maximum travel. When piston 20 moves beyond the position illustrated in FIG. 2 toward the position illustrated in FIG. 3, contact tips 86 and 96 of electrical contacts 80 and 90 urge bridging contactor 32 in the direction away from end 42 of cylindrical cavity 40 (to the reader's right in FIGS. 2 and 3) thereby restraining valve element 22 from continuing to move with the rest of piston 20 and causing valve eyelet 37 to separate from valve seat 36 thereby opening valve 50 as illustrated in FIG. 3.

Continuing now with reference to FIGS. 1 through 9, the crash sensing switch 10 comprises outer container 12, seal compressing washer 14, elastomeric seal 15, cup 16, integral connector 18, piston 20, bias spring 48, terminals 60 and 70, contact retainers 68 and 78, electrical contacts 80 and 90, contact height adjusting wedges 88 and 98, and diagnostic resistor 138.

Outer container 12 is made from a material appropriate for protecting the cup 16 and integral connector 18 from damage and contamination. Brass and stainless steel are appropriate materials that are advantageously resistant to corrosion. Seal compressing washer 14 is made from a suitable inexpensive material such as steel and placed in or pressed into outer container 12. During manufacture the remaining components of crash sensing switch 10 are placed in outer container 12 and retained by a suitable means. One suitable means, illustrated in FIG. 1, is forming the lip 108 of outer container 12 around integral connector 18 while pressing outer container 12 and integral connector 18 together to compress elastomeric seal 15. When compressed, elastomeric seal 15 prevents intrusion of foreign materials and maintains a constant quantity of air inside the crash sensing switch 10.

Cup 16 is preferably made on an automatic lathe of a material chosen for machining ease such as free machining brass. Inside diameter 41 is preferably coated with a material offering low frictional resistance to the movement of piston 20. One suitable material is Emrilon 330 supplied by Acheson Colloids of Benton Harbor, Mich.

Figure 5:
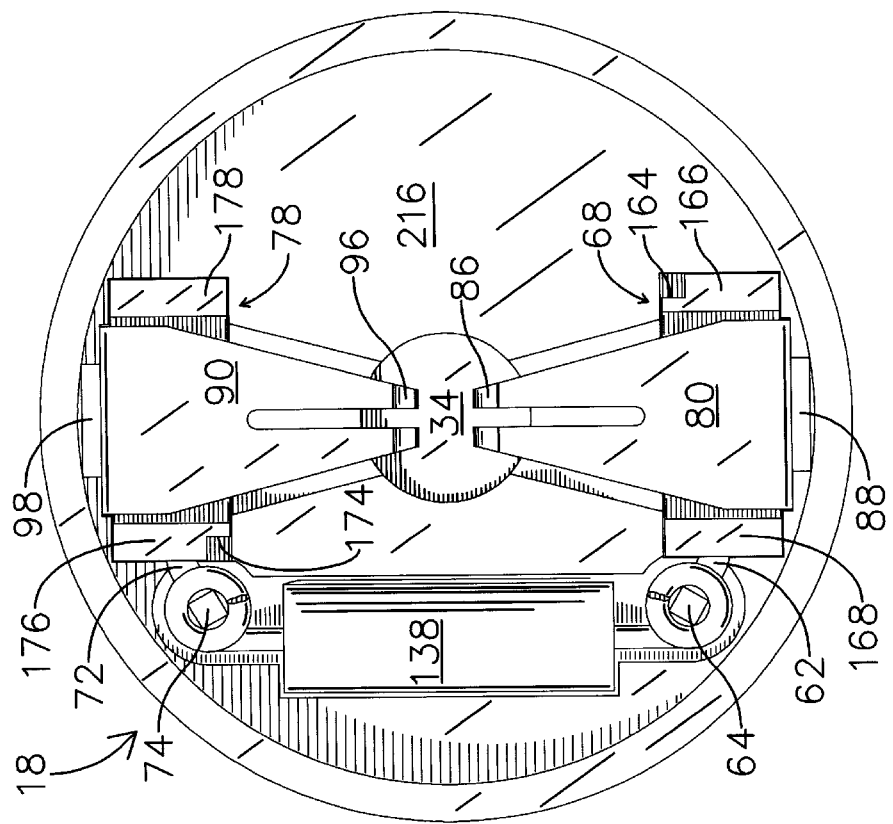
FIG. 5 shows the internal side of the integral connector of the first embodiment of the invention and illustrates the electrical contacts, the contact retainers, the contact adjusting wedges, the diagnostic resistor and the connection of the diagnostic resistor to the connector pins.

Integral connector 18 is preferably made by injection molding a suitable plastic around terminals 60 and 70. One suitable plastic is polyphenylene sulfide filled with an appropriate filler such as glass fibers. It is dimensionally stable and has minimal tendency to absorb water. Integral connector 18 has an exterior face 112 and cylindrical extension 114 that form a conventional electrical connector with contact pins 66 and 76 in cavity 116. It also has an interior face shaped to receive contact retainers 68 and 78, electrical contacts 80 and 90, contact height adjusting wedges 88 and 98 and diagnostic resistor 138. Refer to FIG. 5 for an elevation view of the interior face of integral connector 18. Refer to FIG. 1 for a sectional view illustrating some features of integral connector 18. Integral connector 18 fits into outer container 12 and the combination with seal compressing washer 14 and elastomeric seal 15 forms a tight enclosure as described hereinabove with reference to outer container 12.

Terminal 60 comprises a head structure 62 and a contact pin segment 66 that extends into cavity 116 of integral connector 18 for making electrical contact with a pin of a mating connector (not illustrated). Head structure 62 includes contact surface 63 and a post 64 for wrapping with a resistor lead. Terminal 60 is illustrated only partially in FIGS. 1 and 5 but FIG. 9 shows an isometric view of terminal 70 which is its mirror image. The numbers 60, 62, 63, 64, and 66 applicable to terminal 60 are replaced in FIG. 9 by 70, 72, 73, 74, and 76 respectively. Terminal 70 comprises a head structure 72 and a contact pin segment 76 that extends into cavity 116 of integral connector 18 for making electrical contact with a pin of a mating connector (not illustrated). Head structure 72 includes contact surface 73 and a post 74 for wrapping with a resistor lead. Refer to FIG. 9 for an isometric view of terminal 70. FIG. 9 also illustrates electrical contact 90 and the double ended arrow on a centerline indicates how connecting segment 92 of electrical contact 90 mates with contact surface 73 of terminal 70 for making an electrical connection therebetween. Terminals 60 and 70 may be made by any known process for manufacturing terminals suitable for molding into an electrical connector and also suitable for connection with the leads of resistor 138 and the electrical contacts 80 and 90.

Contact retainer 68 comprises terminal retaining end 162, positioning key 164, and retainer hold down pads 166 and 168. FIG. 7 shows an isometric view of contact retainer 68. FIG. 7 also shows a phantom illustration of a portion of electrical contact 80 to illustrate the placement of electrical contact 80 with respect to contact retainer 68. Terminal retaining end 162 abuts and applies force to retention segment 81 of electrical contact 80 to hold electrical contact 80 fixed in its position with respect to integral connector 18. Positioning key 164 provides a marker to assure correct orientation of contact retainer 68. Retainer hold down pads 166 and 168 extend above electrical contact 80 and abut lip 160 of cup 16. Retainer hold down pads 166 and 168 also extend slightly above surface 216 of integral connector 18 as illustrated in FIG. 1 to assure contact with lip 160 of cup 16. Lip 160 of cup 16 applies pressure to hold down pads 166 and 168 to fix the positions of both electrical contact 80 and contact retainer 68 with respect to integral connector 18.

Contact retainer 78 comprises terminal retaining end 172, positioning key 174, and retainer hold down pads 176 and 178. There is no isometric illustration of contact retainer 78 because it is the same as contact retainer 68 except that its elements are called out as 172, 174, 176 and 178 instead of 162, 164, 166 and 168 respectively. Terminal retaining end 172 abuts and applies force to retention segment 91 of electrical contact 90 to hold electrical contact 90 fixed in its position with respect to integral connector 18. Positioning key 174 provides a marker to assure correct orientation of contact retainer 78. Retainer hold down pads 176 and 178 extend above electrical contact 90 and abut lip 160 of cup 16. Retainer hold down pads 176 and 178 also extend slightly above surface 216 of integral connector 18 as illustrated in FIG. 1 to assure contact with lip 160 of cup 16. Lip 160 of cup 16 applies pressure to hold down pads 176 and 178 to fix the positions of both electrical contact 90 and contact retainer 78 with respect to integral connector 18.

Electrical contact 80 comprises retention segment 81 for retaining by contact retainer 68, connecting segment 82 for making electrical contact with contact surface 63 of terminal 60, adjustment segment 83, contact arm 84, and contact tips 86. Refer to FIG. 8 for an isometric view of electrical contact 80. Electrical contact 80 is made of thermostat metal. Thermostat metal is metallic sheet formed of multiple layers having different thermal expansion coefficients thereby making a sheet that bends according to the temperature. The outside layers 87 and 89 of electrical contact 80 are illustrated in FIG. 8. The material of outside layer 87 has a smaller thermal expansion coefficient than the material of outside layer 89. Gold plating on contact tips 86 minimizes electrical resistance when contacting bridging contactor 32. Similarly, electrical contact 90 comprises retention segment 91 for retaining by contact retainer 78, connecting segment 92 for making electrical contact with contact surface 73 of terminal 70, adjustment segment 93, contact arm 94, and contact tips 96. Refer to FIG. 9 for an isometric view of electrical contact 90. The illustration in FIG. 9 of electrical contact 90 is the same except for orientation and reduced size as the illustration in FIG. 8 of electrical contact 80. The material of outside layer 97 of electrical contact 90 has a smaller thermal expansion coefficient than the material of outside layer 99. Gold plating on contact tips 96 minimizes electrical resistance when contacting bridging contactor 32.

Contact height adjusting wedge 88 adjusts the height of contact tips 86 above stop 34 in integral connector 18 to accurately meet the performance specifications of the crash sensing switch 10. Similarly, contact height adjusting wedge 98 adjusts the height of contact tips 96 above stop 34 in integral connector 18 to accurately meet the performance specifications of the crash sensing switch 10. Sections of contact height adjusting wedges 88 and 98 are illustrated in FIG. 1. Contact height adjusting wedges 88 and 98 are illustrated in FIG. 5.

The heights of contact tips 86 and 96 above stop 34 in integral connector 18 may require adjusting with contact height adjusting wedges 88 and 98 because the process of making the bends between the adjustment segments 83 of the electrical contact 80 or 93 of the electrical contact 90 and the contact arms 84 or 94 respectively may not be sufficiently repeatable. After the bends are made, the electrical contacts must be heated to relieve stresses and the entire process of bending and relieving stresses may cause a part to part variability of plus or minus three degrees in the angles of the bends. One way of adjusting the contact heights is by inserting contact height adjusting wedges 88 and 98 as illustrated in FIGS. 1 and 5. These wedges may be selected from an assortment of wedges each being appropriate for a different contact bend angle. Alternatively, instead of maintaining an assortment, the contact height adjusting wedges 88 and 98 may all be made the same as by injection molding and each wedge modified during crash sensing switch manufacture to match the particular contact which it is to adjust.

The leads of diagnostic resistor 138 are preferably attached by wrapping around posts 64 and 74 respectively of terminals 60 and 70 thereby providing high quality electrical connections and mechanical installation without solder or additional components. Refer to FIG. 5 for an illustration of resistor 138 with its leads connected with terminals 60 and 70 by wrapping around posts 64 and 74. Other methods for attaching the leads of resistor 138 to terminals 60 and 70 are well known to those skilled in the art of assembling electrical components and may be used in place of the wire wrapping method illustrated.

Figure 4:
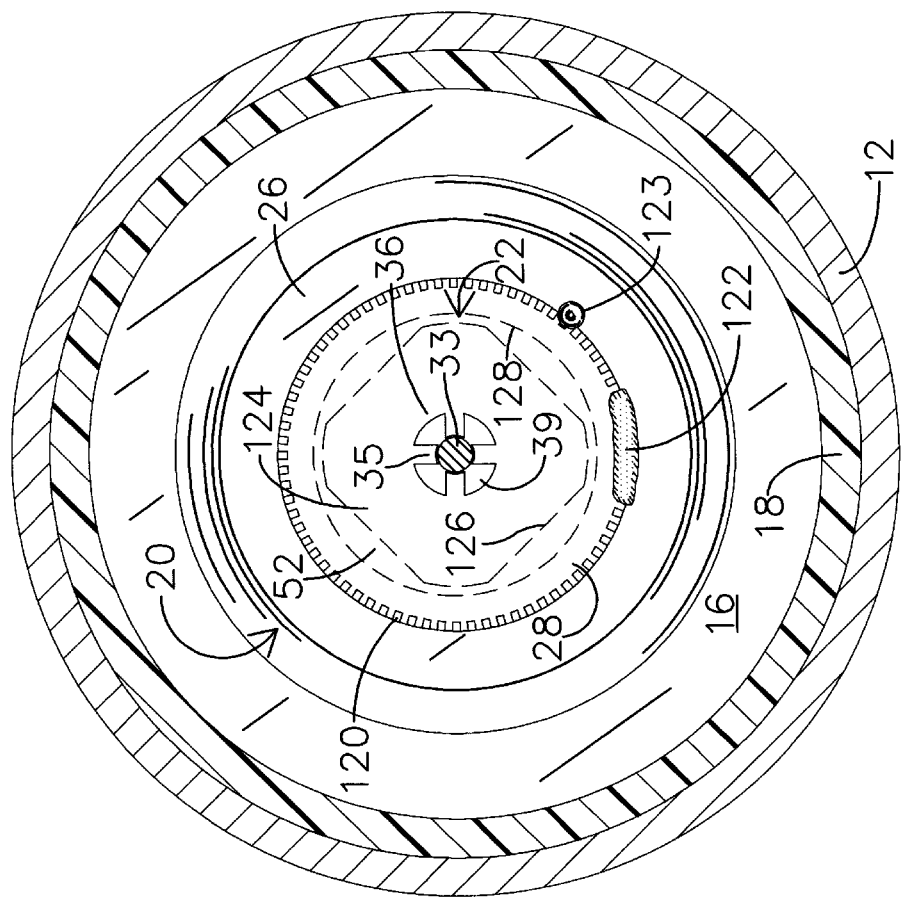
FIG. 4 shows the piston of the first embodiment of the invention and the cup in which the piston moves taken at section 4—4 of FIG. 1.

Continuing now with particular reference to FIGS. 1 and 4, piston 20 comprises valve element 22, outer sleeve 26, fluted cup 28 and valve spring 30. Valve element 22 comprises bridging contactor 32, valve shaft 33, valve eyelet 37, and valve spring retainer 124 having flat sides 126 which in combination with the inside diameter 128 of fluted cup 28 form air ducts 52. Refer to FIG. 4 for an illustration with hidden lines of flat sides 126 of valve spring retainer 124, inside diameter 128 of fluted cup 28, and air ducts 52. Fluted cup 28 comprises inward extensions 35, valve seat 36, bottom surface 38, valve ducts 39 and flutes on its outer diameter which in combination with the inner diameter of outer sleeve 26 form ducts 120. There is a small draft on the outside diameter of fluted cup 28 that facilitates its removal from the mold and provides a means for adjusting the resistance of ducts 120 to air flow. The inner diameter of outer sleeve 26 is tapered to match the draft on the outside diameter of fluted cup 28. Valve 50 of piston 20 comprises valve spring 30, valve seat 36 of fluted cup 28, valve eyelet 37 of valve element 22, and valve ducts 39 of fluted cup 28.

Outer sleeve 26 of piston 20 and fluted cup 28 are assembled by pressing them together. The resistance of the ducts to air flow is affected by the pressure between outer sleeve 26 and fluted cup 28. Therefore, the resistance of ducts 120 to air flow may be adjusted by measuring the air flow while pressing the parts together and gradually increasing the force until a desired air flow rate is achieved. An alternative method of adjusting the air flow is by blocking some of the ducts as with adhesive 122 to provide a predetermined resistance to air flow. Another alternative method for blocking one or more ducts is by deforming outer sleeve 26 of piston 20 in the vicinity of the one or more ducts to create deformations 123 for blocking specific ducts. Valve element 22 is constrained to move along the axis of fluted cup 28 by inward extensions 35 of fluted cup 28 and by the inside diameter 128 of fluted cup 28. Inward extensions 35 engage shaft 33 and restrain it from radial movement while allowing axial movement. Valve spring retainer 124 of valve element 22 engages the inner diameter 128 of fluted cup 28 preventing radial movement while allowing axial movement. One end of valve spring 30 engages the bottom surface 38 of fluted cup 28. The other end of valve spring 30 engages valve spring retainer 124 and urges eyelet 37 toward its closed position against valve seat 36 causing valve 50 to be normally closed.

Two factors substantially determine the calibration of crash sensing switch 10: the resistance of the ducts to air flow and the travel of the piston before the electrical contacts are bridged. This is an advantage of this invention over the aforementioned commercial production crash sensing switch because both factors that determine the calibration of the crash sensing switch 10 are easily adjusted as described hereinabove. The travel is established by the height of contact tips 86 and 96 above stop 34 in integral connector 18 which may be adjusted by using contact height adjusting wedges 88 and 98. The resistance of the ducts to air flow is established when the piston is made by controlling the force when pressing outer sleeve 26 and fluted cup 28 together or by blocking one or more of the ducts 120. The only other variable factor that significantly affects calibration is the manufacturing variation in the gap between the outer diameter of outer sleeve 26 of piston 20 and the inside diameter 41 of cup 16 which, as fully described hereinabove, allows leakage equal to only a few percent of the air flow through the ducts 120. Therefore the crash sensing switch provides easily controlled performance at low cost.

Outer sleeve 26 of piston 20 is preferably made of a dense material to maximize the mass of piston 20 while minimizing the size of crash sensing switch 10. A heavy mass is desirable to achieve maximum contact pressure for good electrical contact. A suitable material for cup 16 and outer sleeve 26 is free machining brass to minimize the machining effort to make them. Both parts should be made of materials having the same thermal expansion coefficient to maintain a constant difference between the inside diameter 41 of cup 16 and outside diameter of outer sleeve 26. The outside diameter of outer sleeve 26 is preferably made of or plated with a material that minimizes friction against the coating on the inside diameter of cup 16. Chromium plating has been found to be suitable when the coating is Emrilon 330 referred to hereinabove with reference to the description of cup 16. The plating is polished for minimum friction. One method of polishing is by grinding in a centerless grinder which is also advantageous because it accurately sets the outside diameter.

Continuing now with reference to FIG. 10, cup 16 and piston 20 are illustrated with the gap between the outside diameter of outer sleeve 26 of piston 20 and the inside diameter 41 of cup 16 greatly exaggerated and the air 310 in the gap shaded. The actual difference between the outside diameter of outer sleeve 26 and the inside diameter 41 of cup 16 is about one thousandth of an inch (0.025 mm.). Arrow 312 indicates radial movement of piston 20 with respect to cup 16. Double tipped arrow 314 indicates movement of air away from the narrowing gap between point 322 on the outside diameter of outer sleeve 26 of piston 20 and point 324 on the inside diameter 41 of cup 16.

Figure 11:
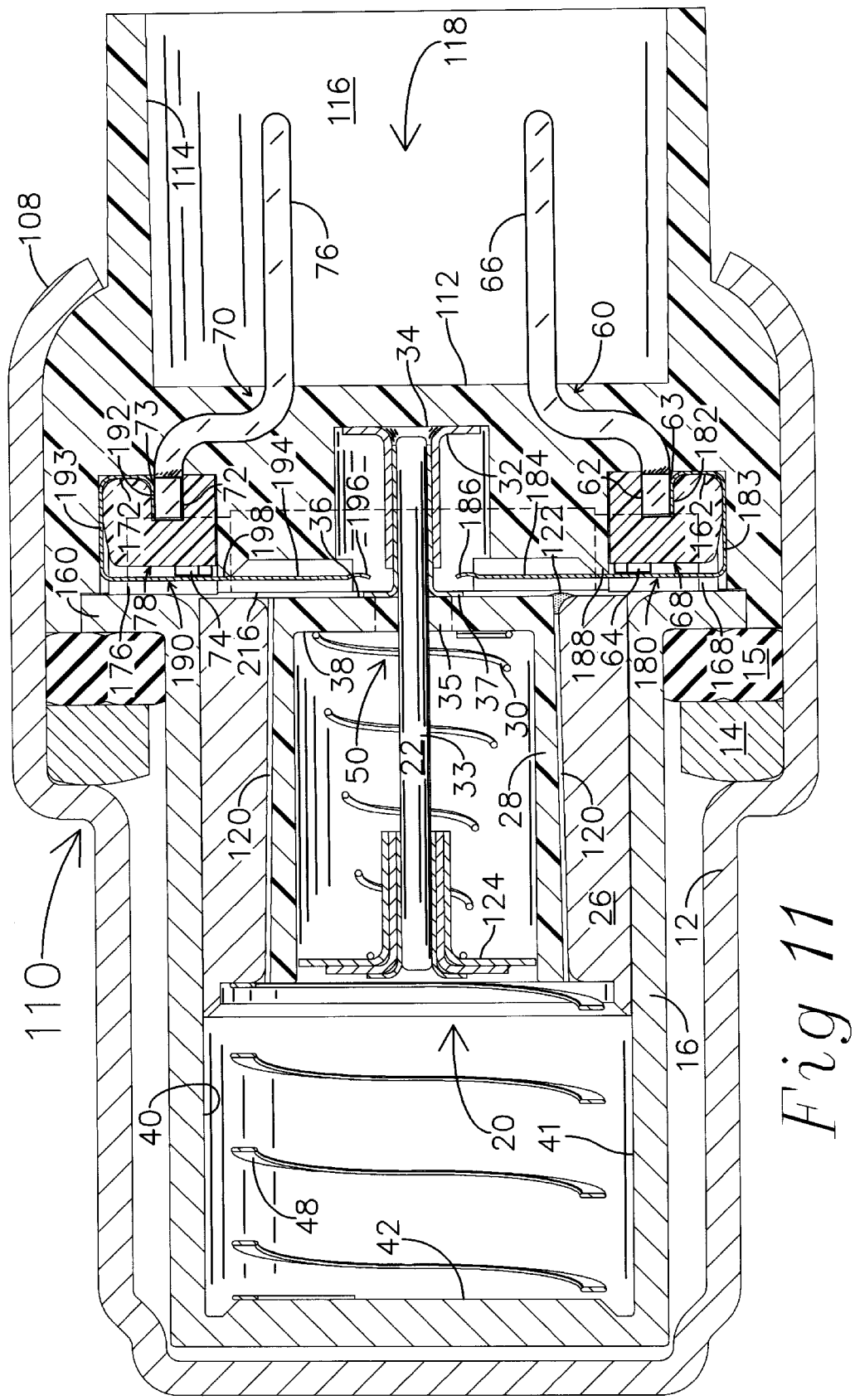
FIG. 11 illustrates a second embodiment of the crash sensing switch of the invention. The embodiment illustrated in FIG. 11 differs from the first embodiment of the invention illustrated in FIG. 1 by showing the use of contact height setters instead of contact height adjusting wedges.
Figure 13:
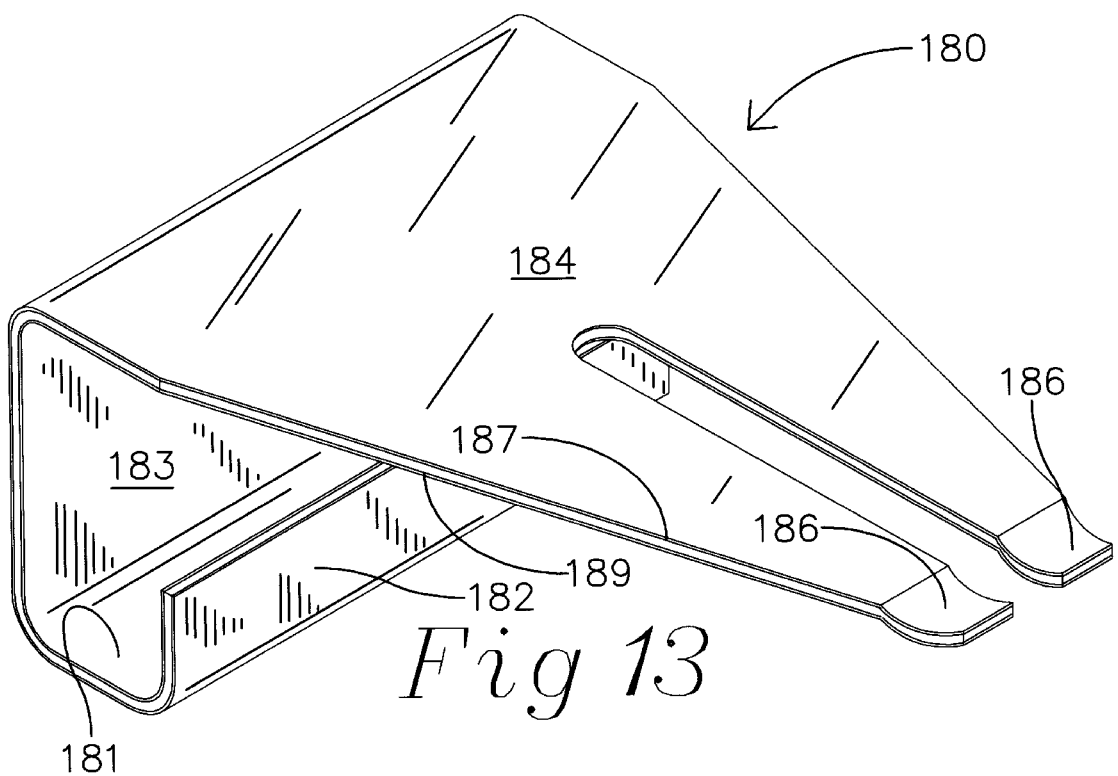
FIG. 13 shows an isometric view of an electrical contact of the second embodiment of the invention illustrated in FIG. 11.

Continuing now with reference to FIGS. 11 and 13, a second embodiment of the invention, crash sensing switch 110, comprises integral connector 118 and electrical contacts 180 and 190 in place of integral connector 18 and electrical contacts 80 and 90. Integral connector 118 is preferably the same as integral connector 18 except for the presence of contact height setters 188 and 198 and the absence of contact height adjusting wedges 88 and 98. Electrical contacts 180 and 190 are preferably the same as electrical contacts 80 and 90 except that adjustment segments 83 and 93 are replaced by vertical segments 183 and 193 which extend between the retention segments 181 and 191 and contact arms 184 and 194 respectively. Refer to FIG. 11 for a sectional view of electrical contact 180. Refer to FIG. 13 for an isometric view of electrical contact 180. Electrical contact 180 comprises retention segment 181 for retaining by contact retainer 68, connecting segment 182 for making electrical contact with contact surface 63 of terminal 60, vertical segment 183, contact arm 184, and contact tips 186. Electrical contact 180 is made of thermostat metal. Thermostat metal is metallic sheet formed of multiple layers having different thermal expansion coefficients making a sheet that bends according to the temperature. The outside layers 187 and 189 of electrical contact 180 are illustrated in FIG. 13. The material of outside layer 187 has a larger thermal expansion coefficient than the material of outside layer 189. Gold plating on contact tips 186 minimizes electrical resistance when contacting bridging contactor 32. Similarly, electrical contact 190 comprises retention segment 191 for retaining by contact retainer 78, connecting segment 192 for making electrical contact with contact surface 73 of terminal 70, vertical segment 193, contact arm 194, and contact tips 196. Refer to FIG. 11 for a sectional view of electrical contact 190. There is no isometric view of electrical contact 190 because it is the same as electrical contact 180 except that its elements are identified by numbers 191, 192, 193, 194, 196, 197 and 199 instead of 181, 182, 183, 184, 186, 187 and 189 respectively. The material of outside layer 197 of electrical contact 190 has a larger thermal expansion coefficient than the material of outside layer 199. Gold plating on contact tips 196 minimizes electrical resistance when contacting bridging contactor 32. The bends between the vertical segments 183 and 193 and the contact arms 184 and 194 respectively are made sufficiently acute that at all temperatures the resiliency of the electrical contacts causes contact arms 184 and 194 to abut the contact height setters 188 and 198 respectively as illustrated in FIG. 11.

Contact height setters 188 and 198 fix the nominal positions of contact tips 186 and 196 respectively to accurately meet the performance specifications of the crash sensing switch. An advantage of using contact height setters 188 and 198 compared with the design illustrated in FIG. 1 is that the contact height adjusting wedges are not required which reduces the number of parts and simplifies manufacturing. The effect of temperature on the positions of contact tips 186 and 196 is less than in the crash sensing switch illustrated in FIG. 1 when the same thermostat metal is used. This may be desirable in the case when less thermal compensation is desired. It may also be desirable to use contact height setters 188 and 198 in certain applications in which only very small electrical current will be conducted by the electrical contact because the electrical contact can be made of thinner thermostat metal which, because it is thinner, bends more with temperature and provides full temperature compensation. In an alternate design, full temperature compensation may be provided with contact height setters 188 and 198 and without reduced electrical contact thickness. In this alternate design the piston travel from the normal resting position where bridging contactor 32 rests against stop 34 to where it bridges contacts 180 and 190 is reduced and therefore the movement of contact tips 186 and 196 required to obtain full temperature compensation is reduced.

This design also has the advantage of requiring fewer parts and being easier to manufacture.

Figure 12:
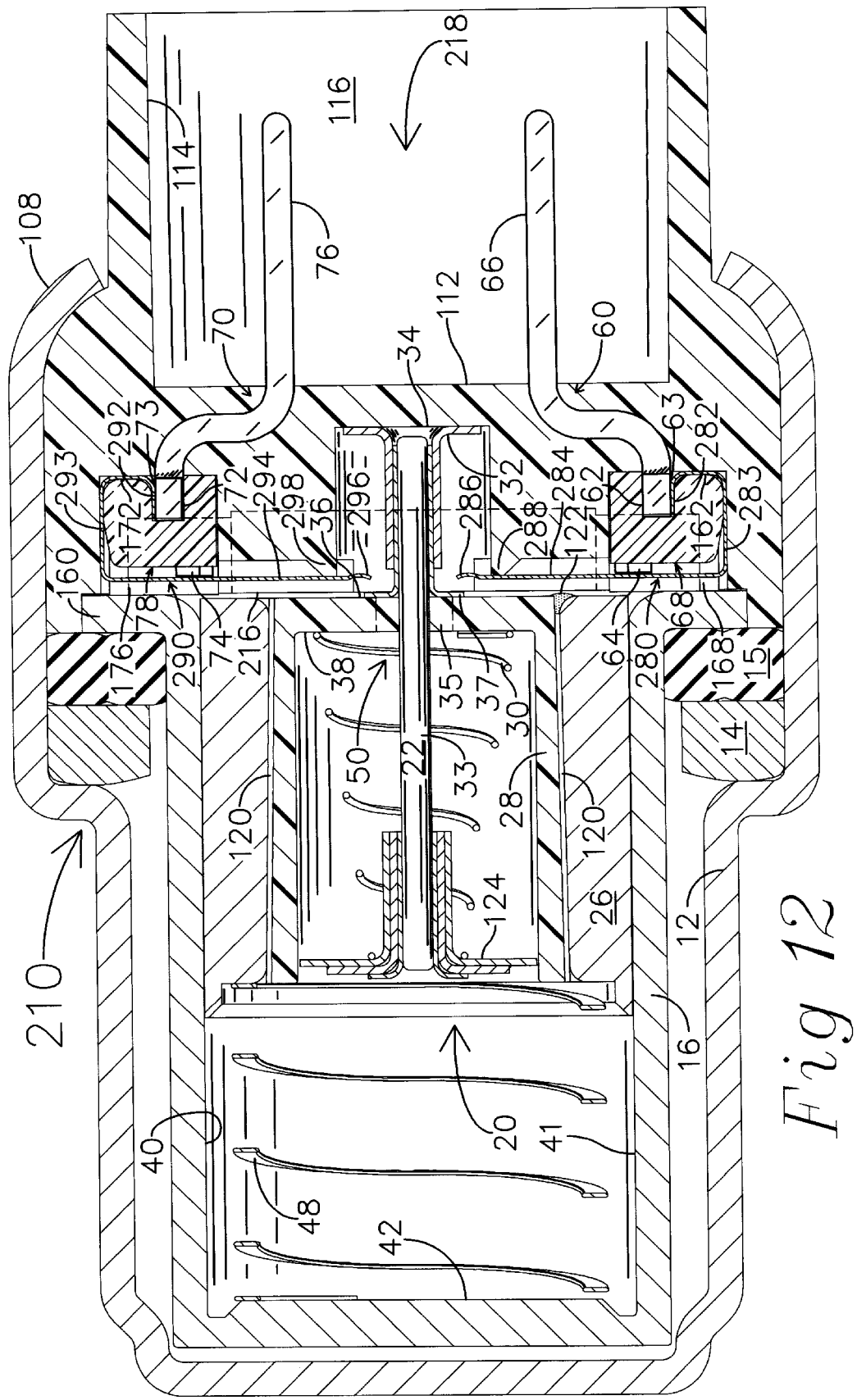
FIG. 12 illustrates a third embodiment of the crash sensing switch of the invention. The embodiment illustrated in FIG. 12 differs from the embodiment illustrated in FIG. 11 by having a second type of contact height setter.
Figure 14:
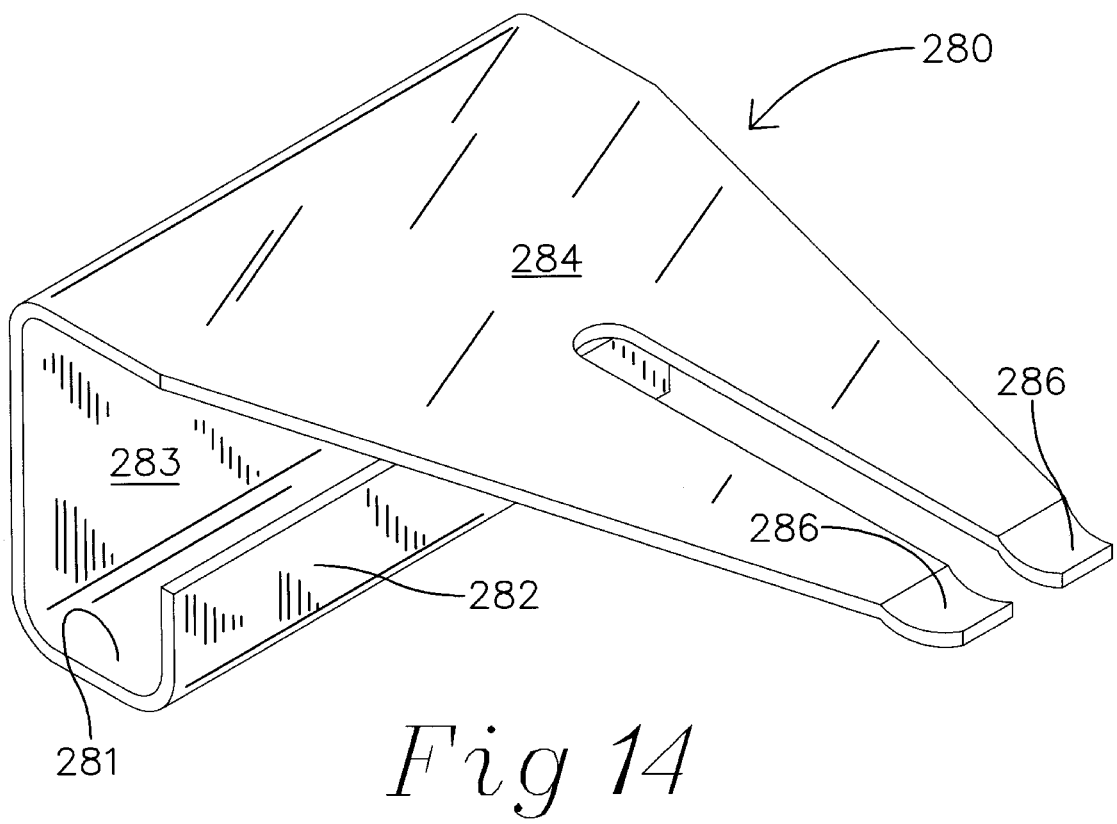
FIG. 14 hows an isometric view of an electrical contact of the third embodiment of the invention illustrated in FIG. 12.

Continuing now with reference to FIGS. 12 and 14, a third embodiment of the invention, crash sensing switch 210, comprises integral connector 218 and electrical contacts 280 and 290 in place of integral connector 18 and electrical contacts 80 and 90. Integral connector 218 is preferably the same as integral connector 118 except for the presence of contact height setters 288 and 298 instead of contact height setters 188 and 198. Electrical contacts 280 and 290 are preferably the same as electrical contacts 180 and 190 except that the material is not thermostat metal and is preferably a high electrical conductivity spring metal such as beryllium copper. Electrical contact 280 comprises retention segment 281 for retaining by contact retainer 68, connecting segment 282 for making electrical contact with contact surface 63 of terminal 60, vertical segment 283, contact arm 284, and contact tips 286. Refer to FIG. 12 for a sectional view of electrical contact 280. Refer to FIG. 14 for an isometric view of electrical contact 280. Gold plating on contact tips 286 minimizes electrical resistance when contacting bridging contactor 32. Similarly, electrical contact 290 comprises retention segment 291 for retaining by contact retainer 78, connecting segment 292 for making electrical contact with contact surface 73 of terminal 70, vertical segment 293, contact arm 294, and contact tips 296. Refer to FIG. 12 for a sectional view of electrical contact 290. There is no isometric view of electrical contact 290 because it is the same as electrical contact 280 except that its elements are identified by numbers 291, 292, 293, 294, and 296 instead of 281, 282, 283, 284, and 286 respectively. Gold plating on contact tips 296 minimizes electrical resistance when contacting bridging contactor 32. The bends between the vertical segments 283 and 293 and the contact arms 284 and 294 respectively are made sufficiently acute that the resiliency of the electrical contacts causes contact arms 284 and 294 to abut the contact height setters 288 and 298 respectively as illustrated in FIG. 12.

Contact height setters 288 and 298 fix the nominal positions of contact tips 286 and 296 respectively to accurately meet the performance specifications of the crash sensing switch. An advantage of designs using contact height setters 288 and 298 compared with the design illustrated in FIG. 1 is that the contact height adjusting wedges are not required which reduces the number of parts and simplifies manufacturing. The positions of contact tips 286 and 296 do not change with temperature. This results in a crash sensing switch that closes at lower velocity changes at low temperatures than at high temperatures.

The materials referred to hereinabove are only suggestions and other materials may be selected by those skilled in the appropriate arts.

The operation of the crash sensing switch 10 of the invention will now be described with reference to FIGS. 1 through 9. In operation of the system, the force of bias spring 48 normally holds bridging contactor 32 of piston 20 against stop 34 thereby keeping piston 20 in a normal resting position. When a deceleration much greater than one g (one times the acceleration of gravity) is applied to the crash sensing switch 10, as would happen during an vehicular crash, the inertia of the piston 20 causes it to move toward end 42 of cylindrical cavity 40 carrying bridging contactor 32 away from stop 34 and toward contact tips 86 and 96 of electrical contacts 80 and 90. For this movement to occur (except at extremely high decelerations that would not normally be encountered by a crash sensing switch) some of the air in chamber 44 must pass either through the ducts 120 or through the gap between outer sleeve 26 of piston 20 and the inside diameter 41 of cup 16 into the chamber 46 (refer to FIG. 2 for an illustration of chambers 44 and 46). As discussed hereinabove when describing the invention and referring particularly to FIGS. 1 through 3, the preponderance of the air passes through ducts 120 and only a small fraction of the air passes through the gap between outer sleeve 26 and the inside diameter 41. The movement of the air is resisted by the viscosity of the air thereby causing the pressure in chamber 44 to be greater than the pressure in chamber 46. This pressure differential is proportional to the deceleration of the crash sensing switch (to the extent that the force of the bias spring 48 and acceleration of the piston 20 relative to crash sensing switch 10 can be ignored) and therefore so is the rate of air flow from chamber 44 to chamber 46 (to the extent that the air flow is not inertial) and contact between contact tips 86 and 96 and bridging contactor 32 is made when a predetermined amount of air has flowed from chamber 44 to chamber 46. (At high decelerations the air in chamber 44 compresses and the air in chamber 46 expands so at high decelerations less than the predetermined amount of air will have flowed from chamber 44 to chamber 46 when bridging contactor 32 bridges the electrical contacts.) Bias spring 48 counteracts some of the effect of deceleration during a collision. During impact at high speed with a solid object wherein the deceleration may exceed one hundred times the acceleration of gravity the bias spring 48 has a relatively small effect but during longer crash pulses having lower decelerations its affect is to increase the velocity change required for crash sensing switch 10 to close. During normal braking bias spring 48 prevents movement of piston 20.

When the bridging contactor 32 of piston 20 contacts both electrical contact tips 86 and 96 as illustrated in FIG. 2 it completes an electrical circuit comprising terminal 60, electrical contact 80, bridging contactor 32, electrical contact 90, terminal 70, and other components of the occupant protection system that are not illustrated.

Figure 6:
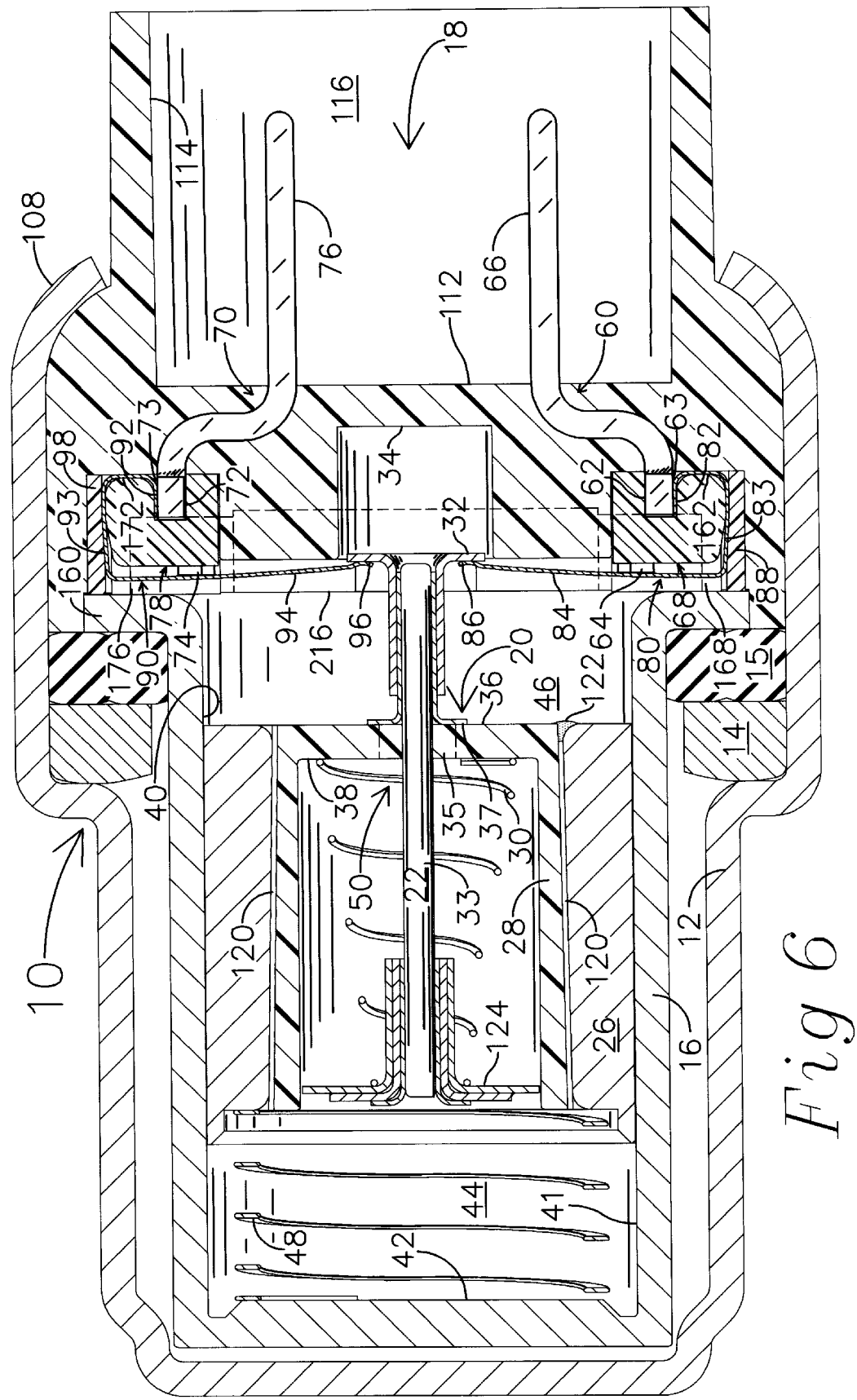
FIG. 6 is the same as FIG. 2 except that it illustrates the reduced piston travel to contact closure at high temperatures resulting from bending of the electrical contacts because of high temperature.

When electric current flows through this circuit the electrical contacts 80 and 90 are heated electrically in proportion to the product of the resistivity of the contact material and the square of the current. This heating of the electrical contacts causes them to attempt to bend and develop curvature as illustrated in FIG. 6 which differs from the nominal electrical contact positions and lack of curvature illustrated in FIG. 1. The curvature increases contact dwell and reduces contact resistance. Contact dwell is increased because the resting positions of contact tips 86 and 96 shift toward stop 34 which increases the distance bridging contactor 32 must return toward stop 34 before it no longer contacts the contact tips 86 and 96. Contact resistance is decreased because the force between the contact tips 86 and 96 and bridging contactor 32 is increased.

After piston 20 has moved a small distance past the position illustrated in FIG. 2 toward the position illustrated in FIG. 3 the force applied by electrical contacts 80 and 90 to bridging contactor 32 overwhelms the urging of valve spring 30 and causes valve eyelet 37 to leave valve seat 36 thereby opening valve 50. The pressure differential between chambers 44 and 46 is relieved by the flow of air through air ducts 52, valve ducts 39, and valve 50 from chamber 44 to chamber 46. The reduced pressure differential after valve 50 opens frees piston 20 (except valve element 22 which is being restrained) to move without viscous damping which increases the contact dwell and reduces the contact resistance of crash sensing switch 10. Electrical contact dwell is improved because removing the pressure differential allows the piston to move farther and faster toward end 42 of cylindrical cavity 40 than it could if the pressure differential remained to urge it in the opposite direction. The contact resistance is reduced because the force between bridging contactor 32 and contact tips 86 and 96 is increased because of the greater bending of valve spring 30 and electrical contacts 80 and 90. If the vehicular velocity change is sufficiently great piston 20 will continue moving until it reaches end 42 of cylindrical cavity 40 as illustrated in FIG. 3.

Another advantage of the retention of valve element 22 so it does not move with the remainder of piston 20 is that electrical contacts 80 and 90 are not required to bend as much as if there were no relative movement of valve element 22. This is advantageous because contact arms 284 and 294 may be made shorter for a given material thickness which may allow a smaller overall diameter of crash sensing switch 10. The reduced bending is illustrated in FIG. 3 where the electrical contacts 80 and 90 have not had to bend as far as they would have had to bend if bridging contactor had remained at its position illustrated in FIG. 2 with respect to piston 20 and piston 20 had moved to the position illustrated in FIG. 3.

At a nominal temperature the contact arms 84 and 94 of electrical contacts 80 and 90 lie in a common plane as illustrated in FIG. 1. At temperatures greater than the nominal temperature the outside layers 87 and 97 of electrical contacts 80 and 90 respectively expand less and become shorter than the outside layers 89 and 99 causing contact arms 84 and 94 to bend as illustrated in FIG. 6 thereby reducing the distance between stop 34 in integral connector 18 and contact tips 86 and 96 and therefore reducing the distance piston 20 must move from its normal resting position before bridging contactor 32 bridges electrical contacts 80 and 90. This compensates for the increased viscosity of air at higher temperatures and the resulting increased resistance of the ducts 120 to air flow. Similarly, at temperatures less than the aforementioned nominal temperature the outside layers 87 and 97 of electrical contacts 80 and 90 respectively contract less and become longer than the outside layers 89 and 99 causing contact arms 84 and 94 to bend in the direction opposite the bending illustrated in FIG. 6 thereby increasing the distance piston 20 must move from its normal resting position before bridging contactor 32 bridges electrical contacts 80 and 90. This compensates for the decreased viscosity of air at lower temperatures and the resulting decreased resistance of the ducts 120 to air flow and enables crash sensing switch 10 to perform consistently over a wide range of temperatures.

The operation of the aforementioned three embodiments of the invention, crash sensing switches 10, 110, and 210, will now be described with reference to FIG. 10. In FIG. 10 the gap between the outside diameter of outer sleeve 26 of piston 20 and the inside diameter 41 of cup 16 is greatly exaggerated and the air 310 in the gap is shaded. During a crash there are cross axis vibrations that cause accelerations to be applied to the crash sensing switch in a direction perpendicular to the axis of the inside diameter 41 of cup 16. In the circumstances illustrated in FIG. 10 cross axis vibrations have caused cup 16 to be moving opposite the direction illustrated by arrow 312. Piston 20 has velocity relative to cup 16 indicated by arrow 312. The relative movement of piston 20 indicated by arrow 312 requires the air 310 in the gap between the inside diameter 41 of cup 16 and the outside diameter of outer sleeve 26 of piston 20 to flow away from the region between points 322 and 324 as indicated by double pointed arrow 314. Viscous resistance to the flow pressurizes the air near the points 322 and 324. This pressure resists the approach of piston 20 toward the inside diameter 41 of cup 16. Further, the forces resulting from viscous flow of air cause piston 20 to tend to center itself in the cylinder defined by inside diameter 41 of cup 16. The centering tendency results because during the part of the cross axis vibration cycle when the relative movement of piston 20 with respect to cup 16 is opposite the movement indicated arrow 312 and the air 310 flows toward the region between points 322 and 324 it flows more freely than when it flows away from points 322 and 324. The freer flow results because the air 310 is expanded while it flows away from the region between points 322 and 324 and it is compressed while it flows toward the region between points 322 and 324. When the air is expanded the gap between points 322 and 324 is wider which reduces viscous resistance compared with when the air is compressed and the gap between points 322 and 324 is narrower. The result is a net average force urging piston 20 to center itself in the cylinder defined by inside diameter 41 of cup 16. Because cross axis vibrations are the normal situation in an vehicular crash FIG. 10 illustrates the normal relation between piston 20 and cup 16 during a vehicular crash. Calculations indicate that viscosity of air 310 is sufficient to prevent piston 20 from contacting the inside diameter 41 of cup 16 in the presence of one hundred g cross axis vibrations at frequencies of one hundred hertz and greater. This provides an air bearing for lubricating the movement of piston 20 in the inside diameter 41 of cup 16.

The operation of the second embodiment of the invention, crash sensing switch 110, will now be described with reference to FIGS. 11 and 13. The crash sensing switch 110 is the same and performs the same as crash sensing switch 10 in all respects except those related to maintaining the height of the contact tips 186 and 196 above stop 34 in integral connector 118. In crash sensing switch 110 the contact arms 184 and 194 engage contact height setters 188 and 198 respectively which fixes the heights of contact tips 186 and 196 above stop 34 in integral connector 18 thereby eliminating the need for contact height adjusting wedges. A length of each of the contact arms extends past the contact height setters toward the contact tips 186 and 196. At temperatures greater than the nominal temperature the outside layers 187 and 197 of electrical contacts 180 and 190 respectively expand more and become shorter than the outside layers 189 and 199 causing contact arms 184 and 194 to curve like contact arms 84 and 94 as illustrated in FIG. 6 but with the points of the arms where they abut contact height setters 188 and 198 fixed by the contact height setters. The curvature of the contact arms 184 and 194 reduces the distance between stop 34 in integral connector 18 and contact tips 186 and 196 and therefore reduces the distance piston 20 must move from its normal resting position before bridging contactor 32 bridges contact tips 186 and 196. This compensates to some degree for the increased viscosity of air at higher temperatures and the resulting increased resistance of the ducts 120 to air flow. However, the design illustrated in FIG. 11 does not compensate to the same degree as the design illustrated in FIG. 1 in the case when the electrical contacts are made of the same material. Similarly, at temperatures less than the aforementioned nominal temperature the outside layers 187 and 197 of electrical contacts 180 and 190 respectively contract more and become longer than the outside layers 189 and 199 causing contact arms 184 and 194 to curve oppositely to the curvature illustrated in FIG. 6 but with the points of the arms where they abut contact height setters 188 and 198 fixed by the contact 35 height setters. The opposite curvature of the electrical contacts increases the distance between stop 34 in integral connector 18 and contact tips 186 and 196 and therefore increases the distance piston 20 must move from its normal resting position before bridging contactor 32 bridges electrical contacts 180 and 190. This compensates to some degree for the decreased viscosity of air at lower temperatures and the resulting decreased resistance of the ducts 120 to air flow. However, the design illustrated in FIG. 11 does not compensate to the same degree as the design illustrated in FIG. 1 in the case when the electrical contacts are made of the same material.

The operation of the third embodiment of the invention, crash sensing switch 210, will now be described with reference to FIGS. 12 and 14. The crash sensing switch 210 is incorporated in a vehicular air bag system in which lower temperatures result in the crash sensing switch 210 closing at a reduced velocity change which compensates for slower air bag deployment at lower temperatures whereby the air bag is in place in sufficient time to protect the vehicle occupant. The crash sensing switch 210 is the same and performs the same as crash sensing switch 10 in all respects except those related to maintaining the height of the contact tips 286 and 296 above stop 34 in integral connector 218. In the crash sensing switch 210 contact arms 284 and 294 engage contact height setters 288 and 298 respectively which fixes the heights of contact tips 286 and 296 which eliminates the need for contact adjustment thereby eliminating the need for contact height adjusting wedges. Only a short length of each of the contact arms extends past the contact height setters toward the contact tips 286 and 296. In this second embodiment of the invention there is no compensation for the variation of air viscosity with temperature and the resulting variation in resistance of the ducts 120 to air flow. This causes crash sensing switch 210 to close at smaller velocity changes at lower temperatures and at larger velocity changes at higher temperatures.

One advantage of the designs illustrated in FIGS. 11 and 12 that do not fully compensate or do not compensate at all for the variation of air viscosity with temperature is that at lower temperatures electrical contact is made sooner and airbag deployment begins sooner than when there is full compensation for the variation of air viscosity with temperature. This is because the decreased viscosity of air at lower temperatures allows the air to flow more freely through ducts 120 thereby allowing bridging contactor 32 of piston 20 to move more rapidly toward contact tips 186 and 196 or 286 and 296 which results in earlier electrical contact and earlier initiation of air bag deployment. Compensating only at higher temperatures may be advantageous because it accelerates deployment at lower temperatures. Eliminating compensation may be advantageous because it lowers the cost in applications such as ADS sensors where compensation for variation of air viscosity with temperature may not be required.

Referring now to FIGS. 15 through 19, there is shown an illustrative embodiment of the crash sensing switch 10' which comprises a switch for sensing an acceleration pulse indicative of a crash. Upon sensing a crash the switch closes to initiate deployment of the occupant protection apparatus. Crash sensing switch 10' differs from crash sensing switches 10, 110 and 210 particularly in having circuitous segments for maximizing the lengths of conductors within the plastic of the integral connector to prevent leakage and, also, in having valves for compensating for the variation of air viscosity with temperature. It will be appreciated as the description proceeds that the invention may be implemented in different embodiments.

Referring particularly to FIGS. 15 through 17 and FIG. 19, the crash sensing switch 10' includes a piston 20' having a gold plated bridging contactor 32' for bridging two electrical contacts 80' and 90'. Piston 20' moves in cylindrical cavity 40' defined by the inside diameter 41' of cup 14' and has a normal resting position (not illustrated) where bridging contactor 32' rests against stop 34' in integral connector 18'. During a frontal collision of a vehicle, piston 20' moves toward end 42' of cylindrical cavity 40' to the position illustrated in FIGS. 15 through 19 where bridging contactor 32' touches contact tips 86' and 96' and completes an electrical circuit comprising terminal 60', electrical contact 80', bridging contactor 32', electrical contact 90', terminal 70', and other components of the occupant protection system that are not illustrated. As it moves, piston 20' displaces air causing it to flow through air ducts 120' and past temperature compensator 222' from chamber 44' to chamber 46' of cylindrical cavity 40'. The preponderance of the displaced air flows through the air ducts 120' and not between piston 20' and the inside diameter 41' of cup 14' by virtue of the close fit therebetween or other known sealing means. One appropriate known sealing means is a piston ring.

Continuing with reference to FIGS. 15 through 19, the crash sensing switch 10' comprises cup 14', elastomeric seal 16', integral connector 18', piston 20', bias spring 48', terminals 60' and 70', electrical contacts 80' and 90', and a diagnostic resistor 102'.

Cup 14' is preferably made of injection molded plastic. One suitable plastic is polyphenylene sulfide filled with an appropriate filler such as glass fibers. It is dimensionally stable and has minimal tendency to absorb water. Cup 14' has pedestal 140' with mounting ears 142' and 144' for attachment to the vehicle by bolting through bolt holes 146' and 148'. Refer to FIG. 18 for an illustration of mounting ears 142' and 144' and bolt holes 146' and 148'. Cup 14' also has contact retaining lobes 242' and 244' for retaining connecting segments of contacts 80' and 90' respectively in electrical contact with contact surfaces 63' and 73' of terminals 60' and 70' respectively. Cup 14' also has surface 248' for joining to surface 288' of integral connector 18' by a suitable means such as melting the surfaces to be joined and pressing together or acoustic welding.

Integral connector 18' is preferably made by injection molding a suitable plastic around terminals 60' and 70'. One suitable plastic is polyphenylene sulfide filled with an appropriate filler such as glass fibers. It is dimensionally stable and has minimal tendency to absorb water. A particularly suitable plastic is Ryton R9 supplied by Phillips Engineered Plastics of Bartlesville Okla. because it is particularly impermeable to water vapor and contains ingredients to enhance sealing at the interface with the terminals.

Figure 15:
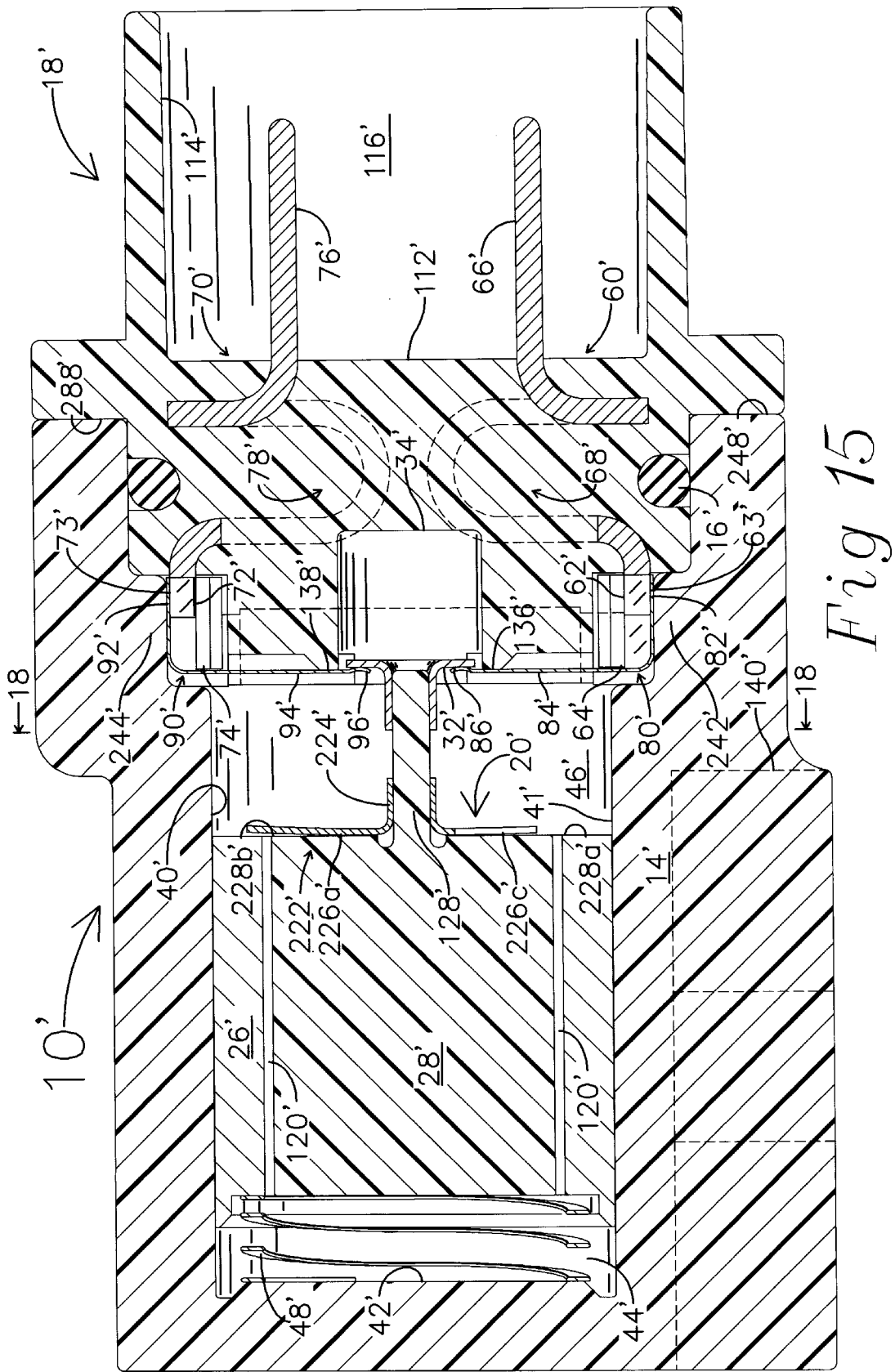
FIG. 15 hows a complete crash sensing switch of a fourth embodiment of the invention with some parts shown in section and the piston positioned where it is beginning to bridge the electrical contacts and with the temperature compensator as it would be at a nominal intermediate temperature.

Integral connector 18' has an exterior face 112' and cylindrical extension 114' that form a conventional electrical connector with contact pins 66' and 76' in cavity 116'. It also has an interior face shaped to receive electrical contacts 80' and 90' and diagnostic resistor 102'. Refer to FIG. 19 for an elevation view of the interior face of integral connector 18'. Refer to FIG. 15 for a sectional view of integral connector 18'. Contact height setters 136' and 138' fix the normal resting positions of contact tips 86' and 96' respectively. Integral connector 18' fits into cup 14' and the combination with elastomeric seal 16' forms a tight enclosure.

Terminal 60' comprises a head structure 62', a contact pin segment 66', and circuitous segment 68'. Head structure 62' includes contact surface 63' and a post 64' for wrapping with a resistor lead. Contact pin segment 66' extends into cavity 116' of integral connector 18' for making electrical contact with a pin of a mating connector (not illustrated). Circuitous segment 68' maximizes the length of conductor within the plastic of integral connector 18' to prevent leakage. Terminal 60' is illustrated partially in section in FIGS. 15 through 17. FIG. 19 shows certain parts of terminal 60' in an elevation view and FIG. 20 shows terminal 60' in an isometric view.

Terminal 70' comprises a head structure 72', a contact pin segment 76', and circuitous segment 78'. Head structure 72' includes contact surface 73' and a post 74' for wrapping with a resistor lead. Contact pin segment 76' extends into cavity 116' of integral connector 18' for making electrical contact with a pin of a mating connector (not illustrated). Circuitous segment 78' maximizes the length of conductor within the plastic of integral connector 18' to prevent leakage. Terminal 70' is illustrated partially in section in FIGS. 15 through 17. FIG. 19 shows certain parts of terminal 70' in an elevation view and FIG. 21 shows terminal 70' in an isometric view.

Terminals 60' and 70' may be made by any known process for manufacturing terminals suitable for molding into an electrical connector and also suitable for connection with the leads of diagnostic resistor 102' and the electrical contacts 80' and 90'. A well suited and commonly used material is gilding metal.

Leakage along terminals 60' and 70' between the interior and the exterior of integral connector 18' is prevented by the extended length of circuitous segments 68' and 78' of the terminals within the plastic molding and by virtue of other known means for preventing leakage. One known means for preventing leakage along the terminals 60' and 70' is etching the circuitous segments 68' and 78' of terminals 60' and 70' respectively by acid, electric discharge or other known etching means before the insert molding operation. Another known means for preventing leakage is to immerse the connector in FlexSeal XT, a liquid sealant supplied by Loctite Corporation, at a pressure of thousands of pounds per square inch. FlexSeal XT then penetrates leakage channels and hardens to seal them. Any other known means for sealing may be employed. It is believed that sufficient sealing is provided by molding polyphenylene sulphide plastic around the circuitous segments 68' and 78' of terminals 60' and 70' respectively and that further insurance against leakage may be provided by etching the circuitous segments 68' and 78' of terminals 60' and 70' respectively.

Electrical contact 80' comprises connecting segment 82' for making electrical contact with contact surface 63' of terminal 60', contact arm 84', and contact tips 86'. Refer to FIG. 20 for an isometric view of electrical contact 80'. Electrical contact 80' is preferably made of a suitable electrical contact material such as beryllium copper. Gold plating on contact tips 86' minimizes electrical resistance when contacting bridging contactor 32'. The double ended arrow on a centerline in FIG. 20 indicates how connecting segment 82' of electrical contact 80' mates with contact surface 63' of terminal 60' for making an electrical connection therebetween. Connecting segment 82' of electrical contact 80' is preferably welded by a method such as capacitor discharge welding to provide a permanent connection to contact surface 63' of terminal 60'. Contact retaining lobe 242' confines connecting segment 82' of electrical contact 80' to close proximity to contact surface 63' of terminal 60' to further assure a good electrical connection therebetween.

Electrical contact 90' comprises connecting segment 92' for making electrical contact with contact surface 73' of terminal 70', contact arm 94', and contact tips 96'. Refer to FIG. 21 for an isometric view of electrical contact 90'. Gold plating on contact tips 96' minimizes electrical resistance when contacting bridging contactor 32'. The double ended arrow on a centerline in FIG. 21 indicates how connecting segment 92' of electrical contact 90' mates with contact surface 73' of terminal 70' for making an electrical connection therebetween. Connecting segment 92' of electrical contact 90' is preferably welded by a method such as capacitor discharge welding to provide a permanent connection to contact surface 73' of terminal 70'. Contact retaining lobe 244' confines connecting segment 92' of electrical contact 90' to close proximity to contact surface 73' of terminal 70' for further assuring a good electrical connection therebetween.

The leads of diagnostic resistor 102' are preferably attached by wrapping around posts 64' and 74' respectively of terminals 60' and 70' thereby providing high quality electrical connections and mechanical installation without solder or additional components. Refer to FIG. 19 for an illustration of diagnostic resistor 102' with its leads connected with terminals 60' and 70' by wrapping around posts 64' and 74'. Other methods for attaching the leads of diagnostic resistor 102' to terminals 60' and 70' are well known to those skilled in the art of assembling electrical components and may be used in place of the wire wrapping method illustrated. A diagnostic resistor could also be included by welding its leads to the circuitous segments 68' and 78' of terminals 60' and 70' respectively prior to injecting molding plastic therearound.

Piston 20' comprises tubular outer sleeve 26', fluted core 28', bridging contactor 32', air ducts 120', stem 128', and temperature compensator 222'. Tubular outer sleeve 26' comprises valve surface 228a'. Fluted core 28' comprises valve surface 228b', stem 128', and flutes on its outer diameter which in combination with the inner diameter of outer sleeve 26' form ducts 120'. Outer sleeve 26' and fluted inner core 28' are pressed together to provide an interference fit. The outer diameter of outer sleeve 26' is preferably coated with a material offering low frictional resistance to the movement of piston 20'. One suitable low friction coating material is Emrilon 330 supplied by Acheson Colloids of Benton Harbor, Michigan. Temperature compensator 222' comprises valve eyelet tube 224' and valve spokes 226a', 226b' and 226c'. Valve eyelet tube 224' of temperature compensator 222' is tightly attached to stem 128' preferably by an interference fit. Bridging contactor 32' is tightly attached to stem 128' preferably by an interference fit.

Figure 16:
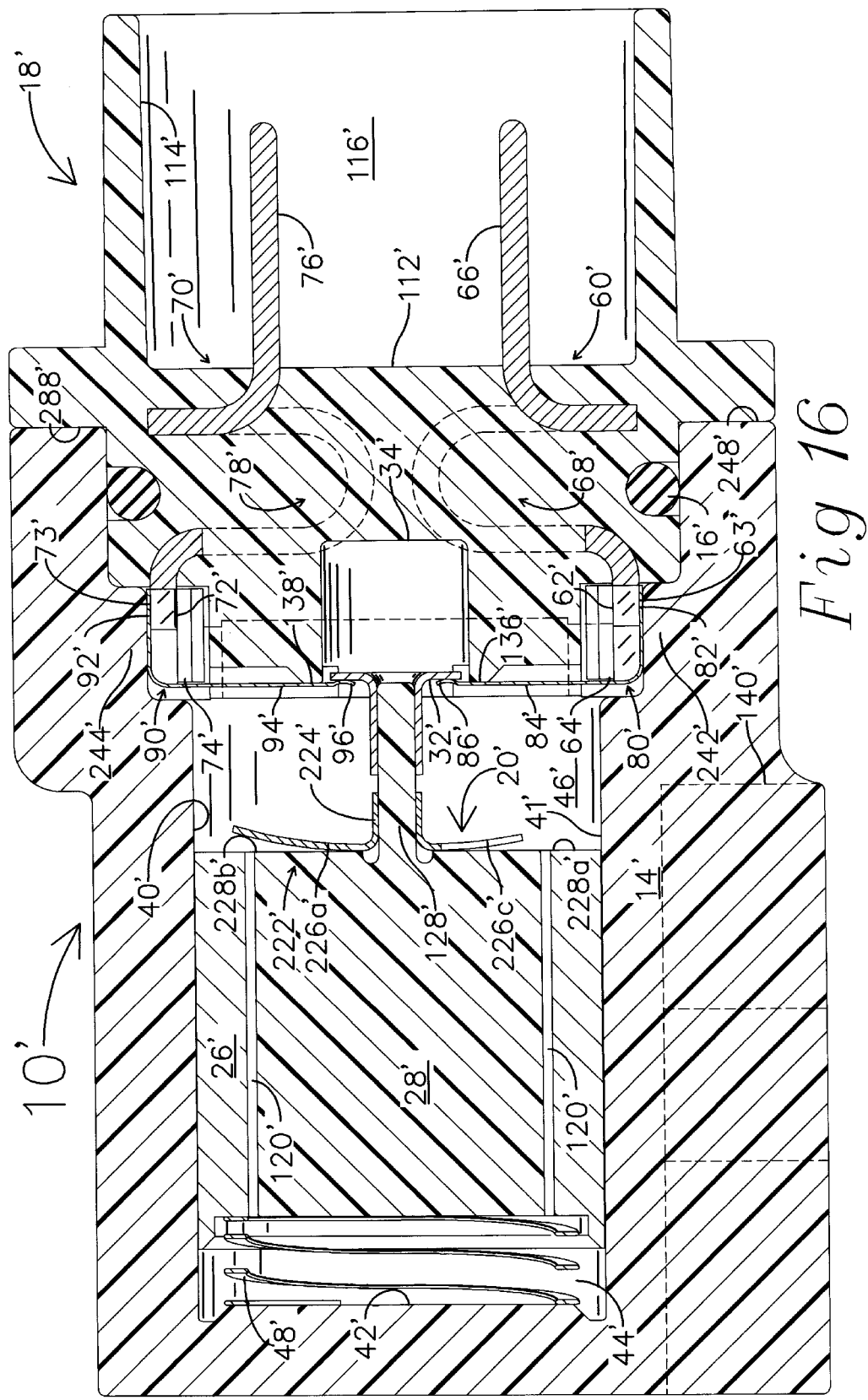
FIG. 16 shows the fourth embodiment of the crash sensing switch of the invention as illustrated in FIG. 15 but with the temperature compensator as it would be at a high temperature.
Figure 17:
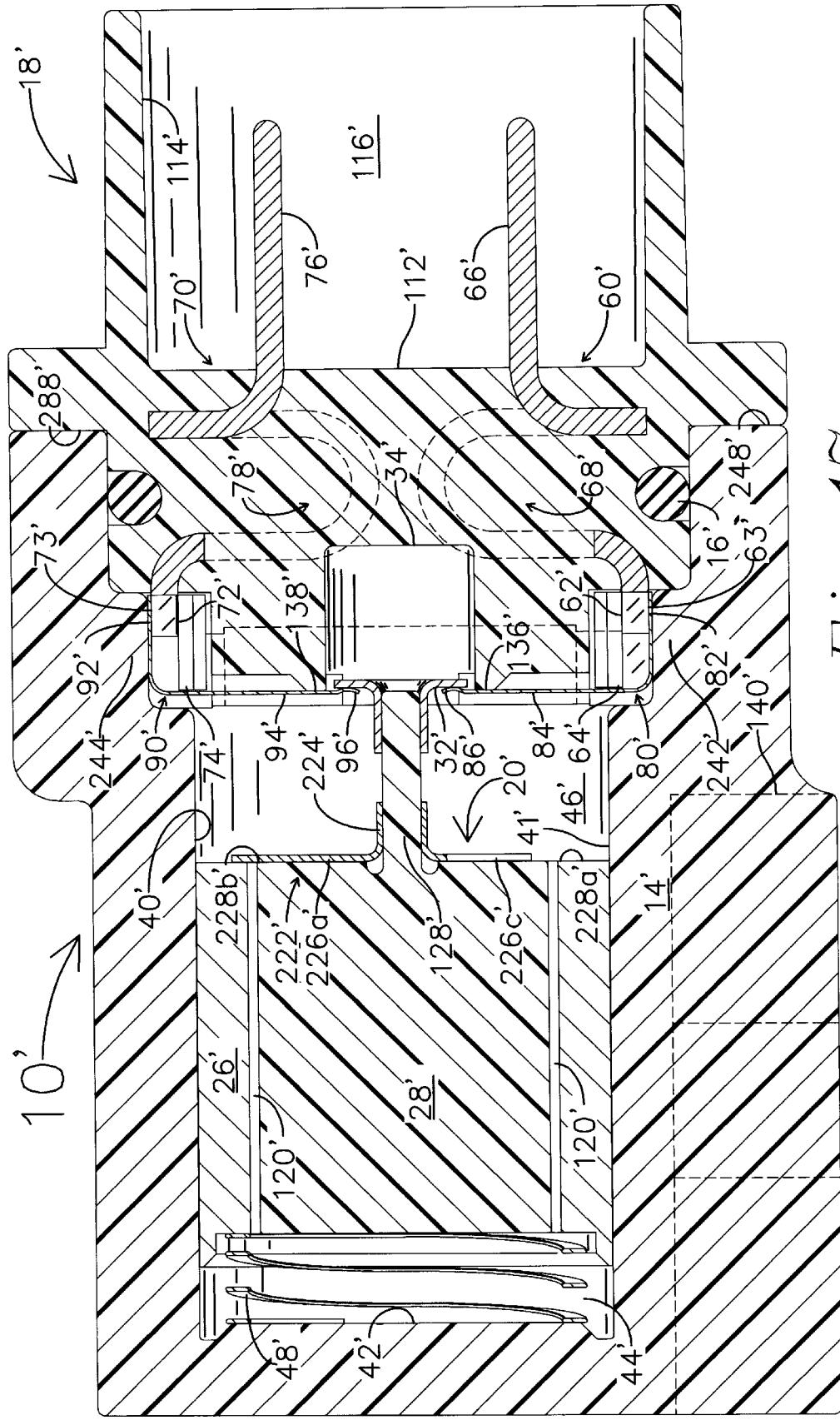
FIG. 17 shows the fourth embodiment of the crash sensing switch of the invention as illustrated in FIG. 15 but with the temperature compensator as it would be at a low temperature.

At high temperatures temperature compensator spokes 226a', 226b' and 226c' bend as illustrated in FIG. 16 thereby allowing air to flow freely through all of the air ducts 120'. At low temperatures temperature compensator spokes 226a', 226b' and 226c' bend as illustrated in FIG. 17 thereby preventing air flow through certain of the air ducts 120'. At an intermediate temperature spokes 226a', 226b' and 226c' bend as illustrated in FIG. 15 thereby reducing but not eliminating air flow through certain of the air ducts 120'.

In applications where crash sensing switch 10' must conduct currents such as three to twelve amperes for firing a squib, outer sleeve 26' of piston 20' is preferably made of a high density material to maximize the mass of piston 20' while minimizing the size of crash sensing switch 10'. A heavy mass is desirable to achieve maximum contact pressure for good electrical contact. One suitable high density material for outer sleeve 26' is brass because it offers substantial mass and is inexpensively made to sufficient precision. Another suitable material is steel. Where large mass is not required, for example, where crash sensing switch 10' is not required to conduct firing current, aluminum is a suitable material for outer sleeve 26'. Aluminum offers the advantages of inexpensive manufacture to accurate tolerances and a thermal expansion coefficient similar to that of the polyphenylene sulfide plastic. Anodized aluminum offers the further advantage of resistance to corrosion and a low coefficient of friction.

Two factors substantially determine the calibration of crash sensing switch 10': the resistance of the air ducts 120' to air flow and the travel of the piston before the electrical contacts are bridged. This is an advantage of this invention over the aforementioned commercial production crash sensing switch because both factors that determine the calibration of the crash sensing switch 10' are easily controlled during manufacture. The resistance of the air ducts 120' to air flow can be adjusted as described hereinabove with respect to air ducts 120. The travel is established by the height of contact tips 86' and 96' above stop 34' in integral connector 18' which is accurately determined by the molding process wherein the height of height setters 136' and 138' are established. Contact height setters 136' and 138' fix the nominal positions of contact tips 86' and 96' respectively. The only other factor that significantly affects calibration is the manufacturing variation in the gap between the outer diameter of outer sleeve 26' of piston 20' and the inner diameter of cup 14' which allows leakage equal to only a few percent of the air flow through the ducts 120'. Therefore the crash sensing switch 10' provides easily controlled performance at low cost.

The materials referred to hereinabove are preferred but other materials may be selected by those skilled in the appropriate arts.

The operation of the crash sensing switch 10', of the invention will now be described with reference to FIGS. 15 through 19. In operation of the system, the force of bias spring 48' normally holds bridging contactor 32' of piston 20' against stop 34' of integral connector 18' thereby keeping piston 20' in a normal resting position. When a deceleration much greater than one g (one times the acceleration of gravity) is applied to the crash sensing switch 10' as would happen during an vehicular crash, the inertia of the piston 20' causes it to move toward end 42' of cylindrical cavity 40' carrying bridging contactor 32' away from stop 34' of integral connector 18' and toward contact tips 86' and 96' of electrical contacts 80' and 90'. For this movement to occur (except at extremely high decelerations which would not occur in actual crashes) some of the air in chamber 44' must pass either through the air ducts 120' or through the gap between piston 20' and the inside diameter 41' of cup 14' into the chamber 46'. As discussed hereinabove when describing the invention and referring particularly to FIGS. 15 through 19, the preponderance of the air passes through air ducts 120' and only a small fraction of the air passes through the gap between piston 20' and the inside diameter 41' of cup 14'. For the air to flow through air ducts 120' pressure is required to overcome the viscous and inertial resistance thereby requiring the pressure in chamber 44' to be greater than the pressure in chamber 46'. This pressure differential results from the inertial forces resulting from the deceleration of piston 20' reduced by the force of bias spring 48' and is approximately proportional to the deceleration of crash sensing switch 10'. The forces of friction, the bias spring 48' and acceleration of the piston 20' relative to crash sensing switch 10' prevent the proportionality from being exact.

Contact between contact tips 86' and 96' and bridging contactor 32' is made when a predetermined amount of air has flowed from chamber 44' to chamber 46'. At higher decelerations there is some compression of the air in chamber 44' and some expansion of the air in chamber 46' so contact may occur when somewhat less than the predetermined amount of air has flowed from chamber 44' to chamber 46'. Bias spring 48' counteracts some of the effect of deceleration during a collision. During impact at high speed with a solid object wherein the deceleration may exceed one hundred times the acceleration of gravity the bias spring 48' has a relatively small effect but during longer crash pulses having lower decelerations its affect is to increase the velocity change required for crash sensing switch 10' to close. During normal braking bias spring 48' prevents movement of piston 20'.

When the bridging contactor 32' of piston 20' contacts both electrical contact tips 86' and 96' as illustrated in FIGS. 15 through 17 it completes an electrical circuit comprising terminal 60', electrical contact 80', bridging contactor 32', electrical contact 90', terminal 70', and other components of the occupant protection system that are not illustrated thereby allowing electricity to flow through that circuit and initiate deployment of the occupant protection devices.

Referring now to FIGS. 22 and 23, there is shown an illustrative embodiment of the crash sensing switch 10'' which is particularly adapted for detecting a crash of a vehicle and for operating where very high accelerations or decelerations are encountered. Upon sensing a crash the switch closes to initiate deployment of the occupant protection apparatus. Crash sensing switch 10'' differs from crash sensing switches 10', particularly in having a light weight sensing mass with a piston ring and in not having valves for compensating for the variation of air viscosity with temperature. It will be appreciated as the description proceeds that the invention may be implemented in different embodiments.

Continuing with reference to FIGS. 22 and 23, the crash sensing switch 10'' includes a piston 20'' having a gold plated bridging contactor 32'' for bridging two electrical contacts 80'' and 90''. Piston 20'' moves in cylindrical cavity 40'' defined by the inside diameter 41'' of cup 14'' and has a normal resting position where bridging contactor 32'' rests against stop 34'' in integral connector 18''. During a vehicle crash, piston 20'' moves toward end 42'' of cylindrical cavity 40'' to the position illustrated in FIG. 22 where bridging contactor 32'' touches contact tips 86'' and 96'' and completes an electrical circuit comprising terminal 60'', electrical contact 80'', bridging contactor 32'', electrical contact 90'', terminal 70'', and other components of the occupant protection system that are not illustrated. As it moves, piston 20'' displaces air causing it to flow through air ducts 120'' from chamber 44'' to chamber 46'' of cylindrical cavity 40''. The preponderance of the displaced air flows through the air ducts 120'' and not between piston 20'' and the inside diameter 41'' of cup 14'' by virtue of the sealing provided by piston ring 28''. A piston ring is particularly suitable in applications where there are very large accelerations because its frictional drag is small compared with the forces from very large accelerations.

The crash sensing switch 10'' comprises cup 14'', elastomeric seal 16'', integral connector 18'', piston 20'', bias spring 48'', terminals 60'' and 70'', electrical contacts 80'' and 90'', and a diagnostic resistor (not illustrated).

All parts of crash sensing switch 10'' except piston 20'' and bias spring 48'' are the same as the corresponding parts of crash sensing switch 10' and will not be further described. More particularly, cup 14'', elastomeric seal 16'', integral connector 18'', terminals 60'' and 70'' and electrical contacts 80'' and 90'' are the same as cup 14', elastomeric seal 16', integral connector 18', terminals 60' and 70' and electrical contacts 80' and 90' respectively.

Piston 20'' comprises piston element 26'', piston ring 28'', gold plated bridging contactor 32'' air ducts 120'', and stem 128''. Piston element 26'' comprises piston ring groove 126'' and flutes on its inner diameter which in combination with the outer diameter of stem 128'' form ducts 120''. Piston element 26'' and stem 128'' are preferably joined by pressing together to provide an interference fit. Piston element 26'' also has cavity 122'' to reduce its mass and provide space for bias spring 48''. The outer diameter of piston element 26'' is preferably coated with a material offering low frictional resistance to the movement of piston 20''. One suitable low friction coating material is Emrilon 330 supplied by Acheson Colloids of Benton Harbor, Mich. Piston element 26" and piston ring 28" are preferably made of plastic by injection molding. One suitable plastic is polyphenylene sulfide filled with an appropriate filler such as glass fibers. Stem 128" and bridging contactor 32" are preferably joined by pressing together for an interference fit.

Two factors substantially determine the calibration of crash sensing switch 10": the resistance of the air ducts 120" to air flow and the travel of the piston before the electrical contacts are bridged. Both factors are accurately controlled during manufacture. It is believed that molding tolerances during manufacture of piston element 26" will determine the dimensions of air ducts 120" accurately enough that adjustment is not required. The travel is established by the height of contact tips 86" and 96" above stop 34" in integral connector 18". Contact height setters 136" and 138" fix the nominal positions of contact tips 86" and 96" respectively. The leakage past piston ring 28" is expected to be negligible. Therefore the design provides highly repeatable performance at low cost.

The materials referred to hereinabove are preferred but other materials may be selected by those skilled in the appropriate arts.

The operation of the crash sensing switch 10", of the invention will now be described with reference to FIGS. 22 and 23. In operation of the system, the force of bias spring 48" normally holds bridging contactor 32" of piston 20" against stop 34" of integral connector 18" thereby keeping piston 20" in a normal resting position. When a deceleration much greater than one g (one times the acceleration of gravity) is applied to the crash sensing switch 10" as would happen during a vehicle impact the inertia of the piston 20" causes it to move toward end 42" of cylindrical cavity 40" whereby bridging contactor 32" moves away from stop 34" of integral connector 18" and toward contact tips 86" and 96" of electrical contacts 80" and 90". For this movement to occur some of the air in chamber 44" must pass either through the air ducts 120" or through the gap between piston 20" and the inside diameter 41" of cup 14" and past piston ring 28" into the chamber 46". The leakage of air past piston ring 28" is expected to be negligible. For the air to flow through air ducts 120" pressure is required to overcome the viscous and inertial resistance thereby requiring the pressure in chamber 44" to be greater than the pressure in chamber 46". This pressure differential results from the inertial forces resulting from the deceleration of piston 20" reduced by the force of bias spring 48" and is approximately proportional to the deceleration of crash sensing switch 10". The forces of friction, the bias spring 48" and acceleration of the piston 20" relative to crash sensing switch 10" prevent the proportionality from being exact.

Contact between contact tips 86" and 96" and bridging contactor 32" is made when a predetermined amount of air has flowed from chamber 44" to chamber 46". At higher decelerations there is some compression of the air in chamber 44" and some expansion of the air in chamber 46" so contact may occur when somewhat less than the predetermined amount of air has flowed form chamber 44" to chamber 46". When the bridging contactor 32" of piston 20" contacts both electrical contact tips 86" and 96" as illustrated in FIG. 20 it completes an electrical circuit comprising terminal 60", electrical contact 80", bridging contactor 32", electrical contact 90", terminal 70", and other components of the occupant protection system that are not illustrated thereby allowing electricity to flow through that circuit and initiate deployment of the occupant protection devices.

The bias spring 48" counteracts some of the effect of deceleration during a collision. The actual bias force will depend on the particular requirements of the crash sensing switch application, however the following generalizations will usually apply: During a short crash pulse wherein the deceleration may exceed one thousand times the acceleration of gravity the bias spring 48" will have relatively little effect but during much longer crash pulses having much lower decelerations its affect may be more significant.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a crash sensor for an occupant protection system of a vehicle of the type comprising a sealed gas filled tube having an axis, a sensing mass movable axially inside and in close proximity to said tube, said movement causing displacement of said gas and including means for viscously conducting said displaced gas, said sensing mass being movable during a crash from a normal resting position to a second position and there being sensing means for ascertaining when said sensing mass has moved to said second position, the improvement comprising:
flow restricting means for limiting flow of said gas between said sensing mass and said tube, and wherein
said means for viscously conducting comprises a duct for viscously conducting said gas past said flow restricting means.

2. The invention as defined by claim 1 including:

a valve having an open state and a normally closed state and being in fluid communication with said duct for conducting said gas to bypass said duct when in said open state and not when in said closed state, and
means for opening said valve upon a predetermined movement of said sensing mass.

3. The invention as defined by claim 2 including an electrical contact and a contact bridging means, and wherein:
said means for opening said valve comprises said electrical contact and said contact bridging means.

4. The invention as defined by claim 1 wherein:
said flow restricting means comprises a clearance between said sensing mass and said tube.

5. The invention as defined by claim 4 wherein:
said clearance is less than three thousandths of an inch (0.0762 mm.).

6. The invention as defined by claim 1 wherein:
said duct extends parallel to said axis of said tube.

7. The invention as defined by claim 1 wherein:
said sensing mass comprises a first element having a first surface and a second element having a second surface mating with said first surface, and
said duct is defined by said first surface and an impression formed in said second surface.

8. The invention as defined by claim 7 wherein:
said resistance of said duct to flow of said gas is adjusted by applying a controlled pressure between said first surface and said second surface.

9. The invention as defined by claim 1 including a multiplicity of ducts having resistance to flow of gas for viscously conducting said gas past said flow restricting means, and means for blocking certain of said ducts whereby the resistance of said ducts to flow of said gas is adjusted.

10. The invention as defined by claim 9 wherein:

said blocking is accomplished by applying a liquid which hardens to block said certain of said ducts.

11. The invention as defined by claim 1 wherein said sensing means comprises an electrical contact, and wherein:

said electrical contact comprises a contact tip and a contact arm, and including:

a contact height setter for abutting said contact arm.

12. The invention as defined by claim 1 wherein:

said flow restricting means comprises a piston ring.

13. In a crash sensor for an occupant protection system of a vehicle of the type comprising a sensing mass movable during a crash from a normal resting position, the improvement comprising:

sensing means comprising an electrical contact for ascertaining when said sensing mass has moved a predetermined distance from said normal resting position, and said electrical contact comprises thermostat metal thereby providing a predetermined change in said predetermined distance consequent to a predetermined change in temperature.

14. The invention as defined by claim 13 wherein:

said sensing means comprises bridging means movable with said sensing mass, said electrical contact comprises a contact tip, and said electrical contact comprises means for urging said contact tip to move toward said bridging means upon passage of electricity through said electrical contact.

15. The invention as defined by claim 13 wherein:

said electrical contact comprises a contact tip and a contact arm, and including:

a contact height setter for abutting said contact arm.

16. In a crash sensor for an occupant protection system of a vehicle of the type comprising a sensing mass movable in a tube and including an electrical contact and contact bridging means for contacting said electrical contact upon a predetermined movement of said sensing mass, the improvement comprising:

means for causing said contact bridging means to move axially relative to said sensing mass upon movement of said sensing mass beyond said predetermined movement.

17. A crash sensor for an occupant protection system of a vehicle comprising:

a gas filled tube having a tube axis, a sensing mass movable axially inside said tube and, there being a clearance between said sensing mass and said tube and said clearance being such that cross axis vibrations of a vehicle crash cause said gas to lubricate said movement of said sensing mass.

18. The invention as defined by claim 17 wherein:

said sensing mass has a sensing mass axis and said clearance being of such magnitude that said gas operates to position said sensing mass axis at approximately said tube axis during said cross axis vibrations, and said clearance limits axial flow of said gas between said sensing mass and said tube, whereby said clearance becomes approximately annular thereby more effectively limiting said axial flow than when said clearance is crescent-shaped.

19. In a crash sensor for an occupant protection system of a vehicle of the type comprising a sensing mass movable during a crash from a normal resting position and sensing means for ascertaining when said sensing mass has moved to a second position, the improvement comprising:

temperature compensation means for causing said second position to vary with temperature.

20. The invention as defined by claim 19 wherein:

said sensing means comprises an electrical contact having a contact tip and a bridging means for making electrical contact with said contact tip upon movement of said sensing mass to said second position, and said electrical contact comprises thermostat metal thereby providing a predetermined change in said second position consequent to a predetermined change in temperature.

21. The invention as defined by claim 20 wherein:

said electrical contact comprises means for urging said contact tip toward said bridging means upon passage of electricity through said electrical contact.

22. In a crash sensor for an occupant protection system of a vehicle of the type comprising a movable sensing mass wherein movement of said sensing mass causes viscous flow of displaced gas, the improvement comprising:

means utilizing variation of said viscosity with temperature for causing said switch to close more quickly in a crash at a low temperature than it would close in a crash having the same deceleration as a function of time at a nominal temperature that is higher than said low temperature.

23. The invention as defined by claim 22 including:

temperature responsive valve means interacting with said viscous flow and being in a closed state at said nominal temperature and opening to a more open state than said closed state when the temperature is raised above said nominal temperature but remaining in said closed state when the temperature is lowered below said nominal temperature.

24. In a crash sensor for an occupant protection system of a vehicle of the type having an enclosure, sensing means disposed inside said enclosure and responsive to decelerations of a crash and having electricity conducting means connecting said sensing means with an element of said occupant protection system located outside said enclosure, the improvement comprising:

said electricity conducting means having an extended segment insert molded into a plastic injection molding, said molding being located between said inside and said outside, and said segment being of sufficient length to prevent contaminant intrusion from said outside into said inside along said extended segment.

25. The invention as defined by claim 24 wherein said extended segment is etched before being molded into said plastic injection molding.

26. The invention as defined by claim 24 wherein said plastic injection molding comprises polyphenylene sulfide.

27. The invention as defined by claim 24 wherein:

said plastic injection molding is molded of material having the composition of the molding compound designated R9-02 by Phillips Petroleum Company.

28. In a crash sensor for an occupant protection system of a vehicle of the type comprising a sensing mass movable axially inside and in close proximity to a sealed, gas filled tube during a crash from a normal resting position and sensing means for ascertaining when said sensing mass has moved to a second position, the improvement comprising:

flow restricting means for limiting flow of said gas between said sensing mass and said tube, a duct for viscously conducting said gas past said flow restricting means, temperature responsive valve means controlling flow through said duct, said valve means providing a nominal impedance to flow through said duct at a nominal temperature, and said valve means providing less than said nominal impedance at a second temperature that is higher than said nominal temperature.

29. The invention as defined by claim 28 wherein:

said valve means comprises thermostat metal.

30. The invention as defined by claim 29 wherein:

said valve means comprises an arm movable in response to temperature change.

31. The invention as defined by claim 30 wherein:

said valve means comprises thermostat metal, and said arm is linked to said thermostat metal for movement therewith, whereby said arm provides said nominal impedance to flow through said duct at said nominal temperature, and said thermostat metal bends at said second temperature thereby positioning said arm to provide said less than said nominal impedance to flow through said duct at said second temperature.

32. The invention as defined by claim 28 wherein:

said valve means also provides said nominal impedance at temperatures below said nominal temperature.

33. In a crash sensor for an occupant protection system of a vehicle of the type having an interior containing contacts bridged upon sensing a crash and having electricity conducting means connecting said contacts with elements of said occupant protection system that are outside said crash sensing switch, the improvement comprising:

said electricity conducting means being insert molded into a plastic injection molding, and said electricity conducting means having an extended segment inside said molding of sufficient length to prevent contaminant intrusion along said electricity conducting means.

34. The invention as defined by claim 33 wherein said electricity conducting means is etched before being molded into said plastic injection molding.

35. The invention as defined by claim 33 wherein said plastic injection molding comprises polyphenylene sulfide.

36. The invention as defined by claim 35 wherein:

said plastic injection molding comprises fiber-filled polyphenylene sulfide.

37. The invention as defined by claim 33 wherein said extended segment follows a circuitous path inside said plastic thereby minimizing the amount of plastic required to encase said extended segment.

38. The invention as defined by claim 33 wherein said extended segment extends through said molding from an entry point to an exit point, and said extended segment being of greater length than the straight line distance between said points.

39. A crash sensor for an occupant protection system of a vehicle of the type comprising a sensing mass movable axially inside and in close proximity to a sealed, gas filled tube during a crash from a normal resting position, means for viscously conducting the gas displaced by movement of said sensing mass and sensing means for ascertaining when said sensing mass has moved a predetermined distance from said normal resting position, the improvement comprising:

flow restricting means for limiting flow of said gas between said sensing mass and said tube, and wherein said means for viscously conducting is a duct for viscously conducting said gas past said flow restricting means.

40. The invention as defined by claim 39 wherein:

said flow restricting means comprises a clearance between said sensing mass and said tube.

41. The invention as defined by claim 40 wherein:

said clearance is less than three thousandths of an inch.

42. The invention as defined by claim 39 wherein:

said flow restricting means comprises a piston ring.

43. The invention as defined by claim 39 wherein:

said duct extends linearly in the direction of the axis of said tube.

44. The invention as defined by claim 39 wherein:

said sensing mass comprises a first element having a first surface and a second element having a second surface mating with said first surface, and said duct is defined by said first surface and an impression formed in said second surface.

45. The invention as defined by claim 44 wherein:

said duct exhibits a viscous resistance to the flow of said gas, and the viscous resistance of said duct to flow of said gas is adjusted by applying a controlled pressure between said first surface and said second surface.

46. The invention as defined by claim 39 including:

a multiplicity of ducts for viscously conducting said gas past said flow restricting means, means for blocking certain of said ducts whereby the resistance of said ducts to flow of said gas is adjusted.

47. The invention as defined by claim 45 wherein:

said blocking is accomplished by applying a liquid which hardens to block said certain of said ducts.

48. The invention as defined by claim 39 including:

a valve having an open state and a normally closed state and being in fluid communication with said duct for conducting said gas to bypass said duct when in said open state and not when in said closed state, and means for opening said valve upon a predetermined movement of said sensing mass.

49. The invention as defined by claim 48 including an electrical contact and a contact bridging means, and wherein:

said means for opening said valve comprises said electrical contact and said contact bridging means.

50. In a crash sensor for an occupant protection system of a vehicle of the type comprising a sensing mass movable from a resting position in a tube and including electrical contacts and contact bridging means movable with said sensing mass for bridging said electrical contacts upon a predetermined movement of said sensing mass away from said resting position, the improvement comprising:

means for causing said contact bridging means to move axially relative to said sensing mass upon movement of said sensing mass beyond said predetermined movement.

51. A crash sensor for an occupant protection system of a vehicle comprising:

a guiding means having an axis, a sensing mass axially movable relative to said guiding means, said sensing mass being guided in axial movement by said guiding means with a clearance between said sensing mass and said guiding means, a gas occupying said clearance, said clearance being such that cross axis vibrations cause said gas to lubricate said movement of said sensing mass.

52. A crash sensor for an occupant protection system of a vehicle comprising:

a movable sensing mass, guiding means for guiding the movement of said sensing mass, a clearance between said sensing mass and said guiding means, and a gas occupying said clearance, said clearance being such that cross axis vibrations of a vehicle crash cause said gas to lubricate said movement of said sensing mass.

53. The invention as defined by claim 52 wherein:

said guiding means is a tube containing said gas.

54. The invention as defined by claim 52 wherein said guiding means is a tube having a tube axis and containing said gas and wherein:

said sensing mass has a sensing mass axis and said gas operates to position said sensing mass axis at approximately said tube axis during said cross axis vibrations, whereby flow of said gas between said sensing mass and said tube is less than if said sensing mass were not centered in said tube.

55. In a crash sensor for an occupant protection system of a vehicle of the type comprising a movable sensing mass, the movement of said sensing mass being affected by viscosity of a gas, the improvement comprising:

means for utilizing variation of the viscosity of the gas with temperature to cause said switch to close more quickly in a crash at a low temperature than in the same crash at a nominal temperature that is greater than said low temperature, and means for compensating for variation of the viscosity of the gas with temperature at temperatures above said nominal temperature but not below said nominal temperature.

56. In a crash sensor for an occupant protection system of a vehicle of the type comprising a sensing mass movable axially inside and in close proximity to a sealed, gas filled tube, means for viscously conducting the gas displaced by movement of said sensing mass, said sensing mass being movable during a crash from a normal resting position to a second position, and sensing means responsive to movement of said sensing mass to said second position, the improvement comprising:

flow restricting means for limiting flow of said gas between said sensing mass and said tube, and said means for viscously conducting comprises a duct for viscously conducting said gas past said flow restricting means.

57. The invention as defined by claim 56 wherein:

said flow restricting means comprises a clearance between said sensing mass and said tube.

58. The invention as defined by claim 57 wherein:

said clearance is less than three thousandths of an inch.

59. The invention as defined by claim 56 wherein:

said flow restricting means comprises a piston ring.

60. The invention as defined by claim 56 wherein:

said duct extends linearly in the direction of the axis of said tube.

61. The invention as defined by claim 56 wherein:

said sensing mass comprises a first element having a first surface and a second element having a second surface mating with said first surface, and said duct is defined by said first surface and an impression formed in said second surface.

62. The invention as defined by claim 61 wherein:

said duct exhibits a viscous resistance to the flow of said gas, and the viscous resistance of said duct to flow of said gas is adjusted by applying a controlled pressure between said first surface and said second surface.

63. The invention as defined by claim 56 including:

a multiplicity of ducts for viscously conducting said gas past said flow restricting means, means for blocking certain of said ducts whereby the resistance of said ducts to flow of said gas is adjusted.

64. The invention as defined by claim 63 wherein:

said blocking is accomplished by applying a liquid which hardens to block said certain of said ducts.

65. The invention as defined by claim 56 including:

a valve having an open state and a normally closed state and being in fluid communication with said duct for conducting said gas to bypass said duct when in said open state and not when in said closed state, and means for opening said valve upon a predetermined movement of said sensing mass.

66. The invention as defined by claim 65 including an electrical contact and a contact bridging means, and wherein:

said means for opening said valve comprises said electrical contact and said contact bridging means.

67. A crash sensor of the type comprising a sensing mass movable axially inside and in close proximity to a sealed, gas filled tube during a crash from a normal resting position to a second position, said movement causing displacement of said gas, and sensing means for ascertaining when said sensing mass has moved to said second position, the improvement comprising:

flow restricting means for limiting flow of said gas between said sensing mass and said tube, and a duct for viscously conducting said gas past said flow restricting means.

68. In a crash sensor for an occupant protection system of a vehicle of the type comprising a sensing mass movable during a crash from a normal resting position, the improvement comprising:

sensing means for ascertaining when said sensing mass has moved a predetermined distance from said normal resting position, and temperature responsive means for varying said predetermined distance with temperature.

69. A crash sensor for an occupant protection system of a vehicle, said crash sensor comprising a sensing mass movable axially inside a sealed gas filled tube during a crash from a normal resting position and sensing means for ascertaining when said sensing mass has moved a predetermined distance from said normal resting position, the improvement comprising:

sealing means for impeding flow of said gas between said sensing mass and said tube, and duct means for viscously conducting said gas past said sealing means, said sealing means causing a preponderance of gas flow to be through said duct means rather than between said sensing mass and said tube.

70. The invention as defined by claim 69 wherein:

said sealing means comprises a clearance between said sensing mass and said tube.

71. A crash sensor for an occupant protection system of a vehicle of the type comprising a member defining a passage, a sensing mass movable in said passage during a crash from a normal resting position and sensing means for ascertaining when said sensing mass has moved a predetermined distance from said normal resting position, the improvement comprising:

said passage being filled with a gas, sealing means for limiting flow of said gas between said sensing mass and said member, and a duct for viscously conducting said gas past said sealing means.

72. A device for use in a vehicle where it is subject to contact with potentially damaging elements, said device being of the type having an enclosure containing a component of an electronic circuit and having electricity conducting means for connecting said component with a second component located outside said enclosure, the improvement comprising:

said electricity conducting means being insert molded into a plastic injection molding, and said electricity conducting means having an extended segment inside said molding of sufficient length to prevent intrusion of said potentially damaging elements along said extended segment.

73. The invention as defined by claim 72 wherein said extended segment is etched before being molded into said plastic injection molding.

74. The invention as defined by claim 72 wherein said plastic injection molding comprises polyphenylene sulfide.

75. The invention as defined by claim 74 wherein:

said plastic comprising fiber-filled polyphenylene sulfide.

76. The invention as defined by claim 72 wherein said extended segment follows a circuitous path inside said plastic thereby minimizing the amount of plastic required to encase said extended segment.

77. The invention as defined by claim 72 wherein said extended segment extends through said molding from an entry point to an exit point, and said extended segment being of greater length than the straight line distance between said points.

* * * * *